United States Patent [19]
Motomura

[11] Patent Number: 5,974,267
[45] Date of Patent: Oct. 26, 1999

[54] TIMER-CONTROLLED OPTICAL DATA RECORDER DEVICE FOR LENS-FITTED PHOTO FILM UNIT

[75] Inventor: Katsumi Motomura, Saitama, Japan

[73] Assignee: Fuji Photo Film Co., Ltd., Kanagawa, Japan

[21] Appl. No.: 09/145,541

[22] Filed: Sep. 1, 1998

[30] Foreign Application Priority Data

Sep. 10, 1997 [JP] Japan .................................. 9-245742

[51] Int. Cl.[6] .............................. G03B 7/26; G03B 17/24
[52] U.S. Cl. .............................. 396/6; 396/206; 396/317
[58] Field of Search .................................. 396/155, 205, 396/206, 310, 311, 315, 317, 439, 549, 176, 6, 301–304

[56] References Cited

U.S. PATENT DOCUMENTS 5,781,804  7/1998  Constable ...................................... 396/6
5,784,658  7/1998  Hata et al. .................................. 396/311

*Primary Examiner*—Safet Metjahic
*Assistant Examiner*—J. K. Han
*Attorney, Agent, or Firm*—Young & Thompson

[57] ABSTRACT

A lens-fitted photo film unit includes a shutter for providing photo film with an exposure to create a frame. A flash circuit emits flash light to a subject to be photographed. The flash circuit includes a blocking oscillator for converting low voltage of a battery into high voltage of an alternate current by oscillation. An optical data recorder device includes a timer circuit, which starts in response to actuation of the shutter operation. The timer circuit measures predetermined time of lapse, and starts the oscillation of the blocking oscillator. A light-emitting element illuminates with voltage obtained from the blocking oscillator during the predetermined time measured by the timer circuit. Data is recorded optically in a position on the photo film respectively for the frame.

21 Claims, 13 Drawing Sheets

TIMER-CONTROLLED OPTICAL DATA RECORDER DEVICE FOR LENS-FITTED PHOTO FILM UNIT

BACKGROUND OF THE INVENTION

1. Field of the Invention

The present invention relates to an optical data recorder device for a lens-fitted photo film unit. More particularly, the present invention relates to an optical data recorder device, incorporated in a lens-fitted photo film unit, and reliably capable of optical recording of optical data or dot indicia to photo film.

2. Description Related to the Prior Art

There is a lens-fitted photo film unit widely sold and used by many users. The lens-fitted photo film unit is pre-loaded with photo film, and incorporates a shutter mechanism, a photo film winding mechanism and a taking lens, all of which are simply constructed. Examples of the lens-fitted photo film unit include a type in which an electronic flash is built in. This type is specifically usable with convenience in photographing a dark or indoor field of view.

Also there is a system of providing photographic prints produced at plural aspect ratios selectably predetermined for increasing variety in enjoyment of photography. There are C, H and P printing sizes as examples of the aspect ratio of the photographic print. The C printing size is 89×127 mm, and used as the full-size, which is the most widely used format in the conventional photography. The H printing size is 89×157 mm, and determined similar to the aspect ratio of a display format of high-definition television (HDTV). The P printing size is 89×252 mm, and determined substantially two times as long as the C printing size in its longitudinal direction.

To obtain photographic prints different in the aspect ratio from a single strip of the photo film, there is a suggested method in which all imaging frames are created on the photo film at a common size. Optical data is recorded or imprinted to the photo film in a marginal region outside an effective exposure region for designating the aspect ratio of the photographic print intended for the imaging frame by the user. The optical data is hereinafter referred as print aspect ratio (PAR) indicia. In the course of producing the photographic print, the PAR indicia is detected to read the aspect ratio, for using the aspect ratio or a printing range in the printing operation of the imaging frame.

In a camera capable of photographically recording the optical data such as an exposure-taking date or the PAR indicia, a light-emitting element such as light-emitting diode (LED) is incorporated. The LED is driven in synchronism with movement of the shutter mechanism, to record the optical data to the photo film. The LED is typically inexpensive, has a long life, is stable in light emission, and is rapid in response.

The LED has a threshold voltage of about 2 volts as a minimum voltage to emit light. The LED requires voltage of 3 volts or more to illuminate stably. However a battery accommodated in the lens-fitted photo film unit of the flash built-in type or an inexpensive compact camera has electromotive force of 1.5 volts or so. It is impossible to apply the voltage of the battery directly to the LED.

U.S. Pat. No. 5,784,658 (corresponding to JP-A 8-248572) suggests a flash built-in type of the lens-fitted photo film unit in which the LED is driven to illuminate by a combination of a flash circuit and the battery as a power source having electromotive force of 1.5 volts.

In U.S. Pat. No. 5,784,658 (corresponding to JP-A 8-248572), a trigger switch for triggering emission of flash light is turned on in response to movement of the shutter mechanism to open fully. While the trigger switch is turned on, a blocking oscillator is operated. The blocking oscillator is constituted by an oscillation transistor and an oscillation transformer. Pulsed voltage is derived from a primary winding of the oscillation transformer. The pulsed voltage has a peak of for example 6 volts. The pulsed voltage is applied to the LED to emit light. The time during which the trigger switch is turned on is longer than a period of oscillation of the blocking oscillator. The LED emit light for a plurality of times while the trigger switch is turned on, to expose a position of the photo film to provide it with the PAR indicia.

As the trigger switch is a mechanical switch turned on in synchronism with operation of the shutter mechanism, the trigger switch is likely to have irregularity in the time during which the trigger switch is turned on. The number of times of light emission of the LED is changeable to vary an exposure amount of the optical data. Excess and shortage is likely to occur in the exposure amount of the optical data. Although the time of turning on the trigger switch is longer than the oscillation period of the blocking oscillator, it is somewhat short and insufficient in view of obtaining a light amount for exposing the PAR indicia on the photo film. The exposure amount of the optical data cannot be obtained sufficiently. In utilizing the PAR indicia as the optical data, it is likely that failure occurs in the operation of reading the PAR indicia in the course of producing the photographic print.

SUMMARY OF THE INVENTION

In view of the foregoing problems, an object of the present invention is to provide an optical data recorder device reliably capable of optical recording of optical data or dot indicia to photo film with a sufficient light amount.

In order to achieve the above and other objects and advantages of this invention, an optical data recorder device is provided for use in a camera or a lens-fitted photo film unit. The camera and the lens-fitted photo film unit respectively include a shutter for providing photo film with an exposure to create a frame. A flash circuit emits flash light to a subject to be photographed. The flash circuit includes a blocking oscillator for converting low voltage of a battery into high voltage of an alternate current by oscillation. In the optical data recorder device, a timer circuit starts in response to actuation of the shutter operation, the timer circuit measuring predetermined time of lapse, and starting the oscillation of the blocking oscillator. A light-emitting element illuminates with voltage obtained from the blocking oscillator during the predetermined time measured by the timer circuit, to record data optically in a position on the photo film respectively for the frame.

In a preferred embodiment, a switching element is connected in series with the light-emitting element, turned on during the predetermined time measured by the timer circuit, to drive the light-emitting element.

The flash circuit further comprises a rectifier, connected with the blocking oscillator, for rectifying the alternate current of the high voltage. A main capacitor is charged by a current from the rectifier. A flash discharge tube is connected in parallel with the main capacitor, for instantaneously illuminating with a discharge current of the main capacitor. A trigger circuit applies trigger voltage to the flash discharge tube in response to the actuation of the shutter, to start discharging the main capacitor.

The trigger circuit includes a trigger switch, turned on in response to the actuation of the shutter, for generating the trigger voltage, wherein the timer circuit being started by turning on of the trigger switch.

Furthermore the timer circuit includes a timer capacitor for starting being charged or discharged in response to turning on of the trigger switch. A timer transistor is turned on in accordance with voltage across the timer capacitor, wherein the switching element is turned on while the timer transistor is turned on, and the predetermined time is defined while the timer transistor is turned on.

In a preferred embodiment the timer capacitor is charged in connection with the battery when the trigger switch is turned on, and is discharged when the trigger switch is turned off. The timer transistor is kept turned on after the timer capacitor starts being discharged and until the voltage across the timer capacitor comes down to predetermined voltage.

The blocking oscillator includes an oscillation transformer, a oscillation transistor and an externally operable charger switch, and the oscillation transformer includes primary, secondary and tertiary windings.

The blocking oscillator includes a latch transistor having an emitter and a collector connected in parallel with the charger switch, and the latch transistor is turned on in a first condition where the charger switch is turned off after being turned on, or the latch transistor is turned on in a second condition where the timer transistor is turned on. In the first condition, the blocking oscillator continues the oscillation, to charge the main capacitor irrespective of turning off of the charger switch. In the second condition, the blocking oscillator starts the oscillation, to drive the light-emitting element for the predetermined time, and to charge the main capacitor.

The timer circuit further comprises a first resistor, connected in parallel with the timer capacitor, for discharging the timer capacitor.

The timer circuit further comprises a second resistor connected in series with the first resistor, wherein a connection point between the first and second resistors is connected with a base of the timer transistor.

The timer circuit further comprises a second resistor, connected between a base of the timer transistor and a connection point between the first resistor and the timer capacitor, for avoiding a drop in voltage of the battery when the timer transistor is turned on.

Consequently an optical data recorder device of the present invention is reliably capable of optical recording of optical data or dot indicia to photo film with a sufficient light amount.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
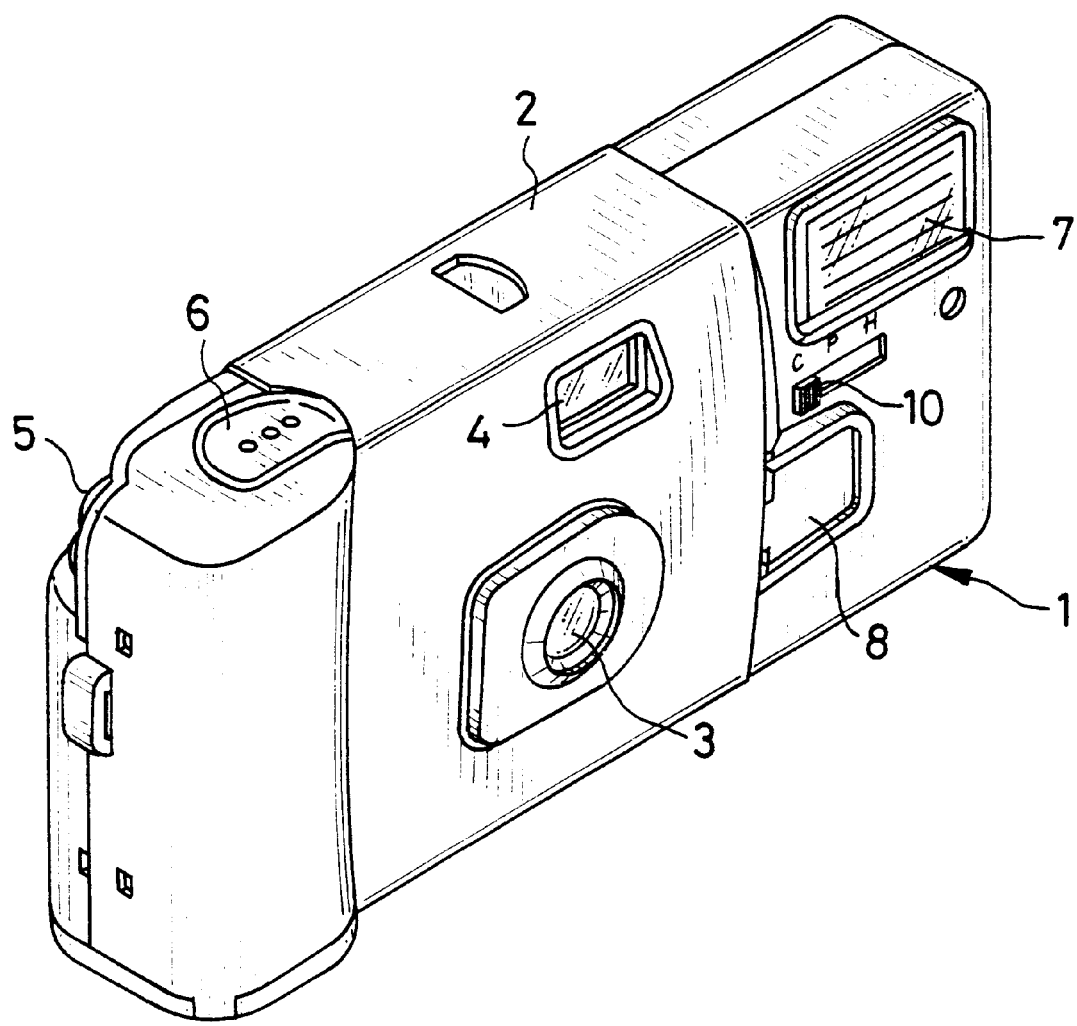
FIG. 1 is a perspective illustrating a lens-fitted photo film unit.

In FIG. 1 is illustrated a lens-fitted photo film unit of a flash built-in type of the present invention. The lens-fitted photo film unit of the present embodiment has a construction in which all frames have the same size of an exposed range, and there are preset printing modes one of which is selected for each of the frames to designate one of printing sizes or aspect ratios which will be used in the course of photographic printing. Information of the selected printing size is optically recorded as indicia in a predetermined position of photo film outside an effective exposure region for frames. The indicia is hereinafter referred to as PAR indicia.

The lens-fitted photo film unit is constituted by a photo film housing 1 and a cardboard wrapper 2 for covering the photo film housing 1. The photo film housing 1 has a simplified mechanism for taking an exposure. The cardboard wrapper 2 has various openings inside which a taking lens 3, a viewfinder 4 and the like are located. The cardboard wrapper 2 has such a shape that it does not cover a winder wheel 5, a shutter release button 6, a flash emitter window 7 or a charger pushbutton 8. A user can take photographs by use of the photo film housing 1 with the cardboard wrapper 2 wound thereabout.

Figure 1A:
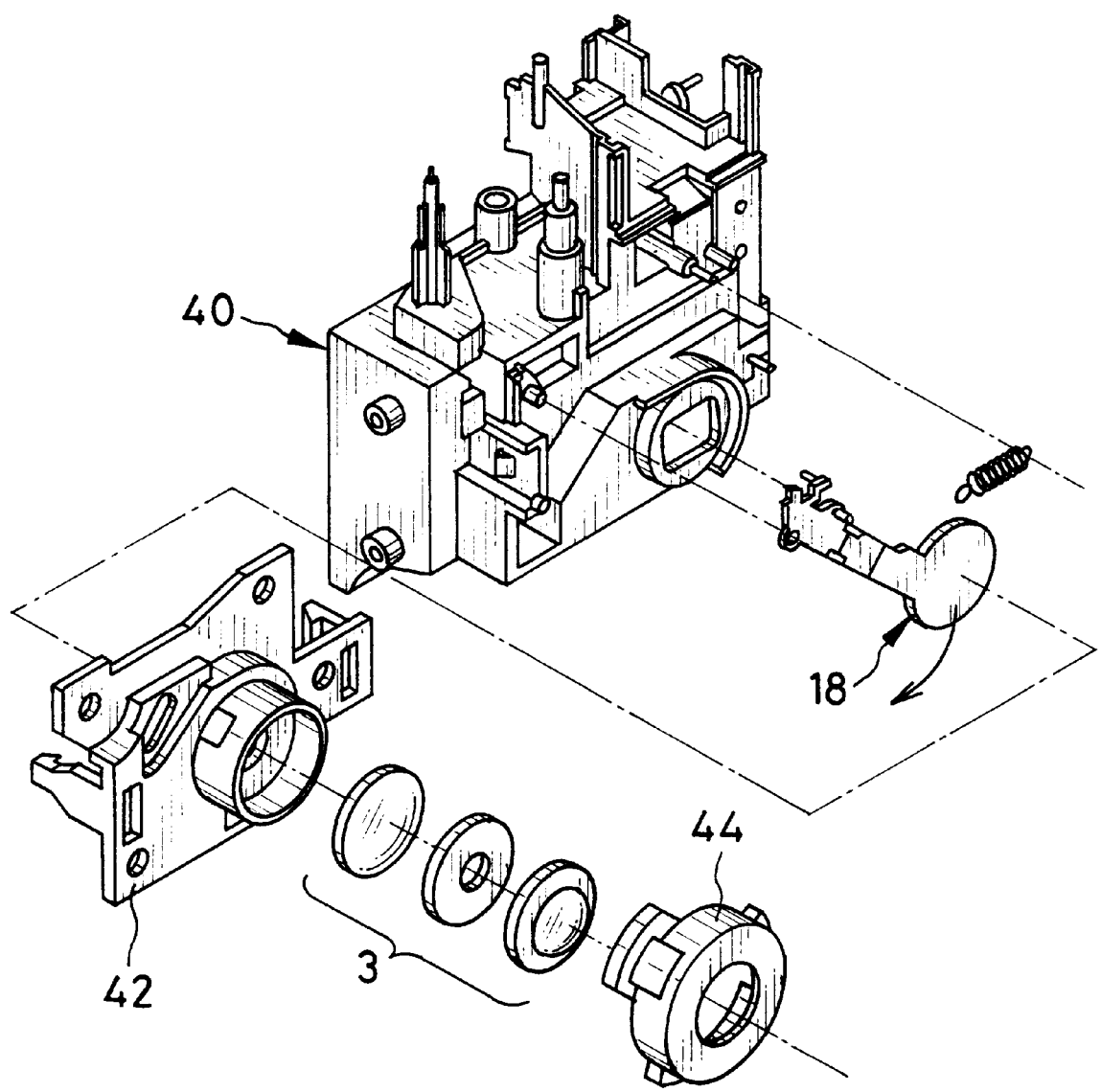
FIG. 1A is a perspective illustrating an exposure-taking unit with a shutter blade.
Figure 2:
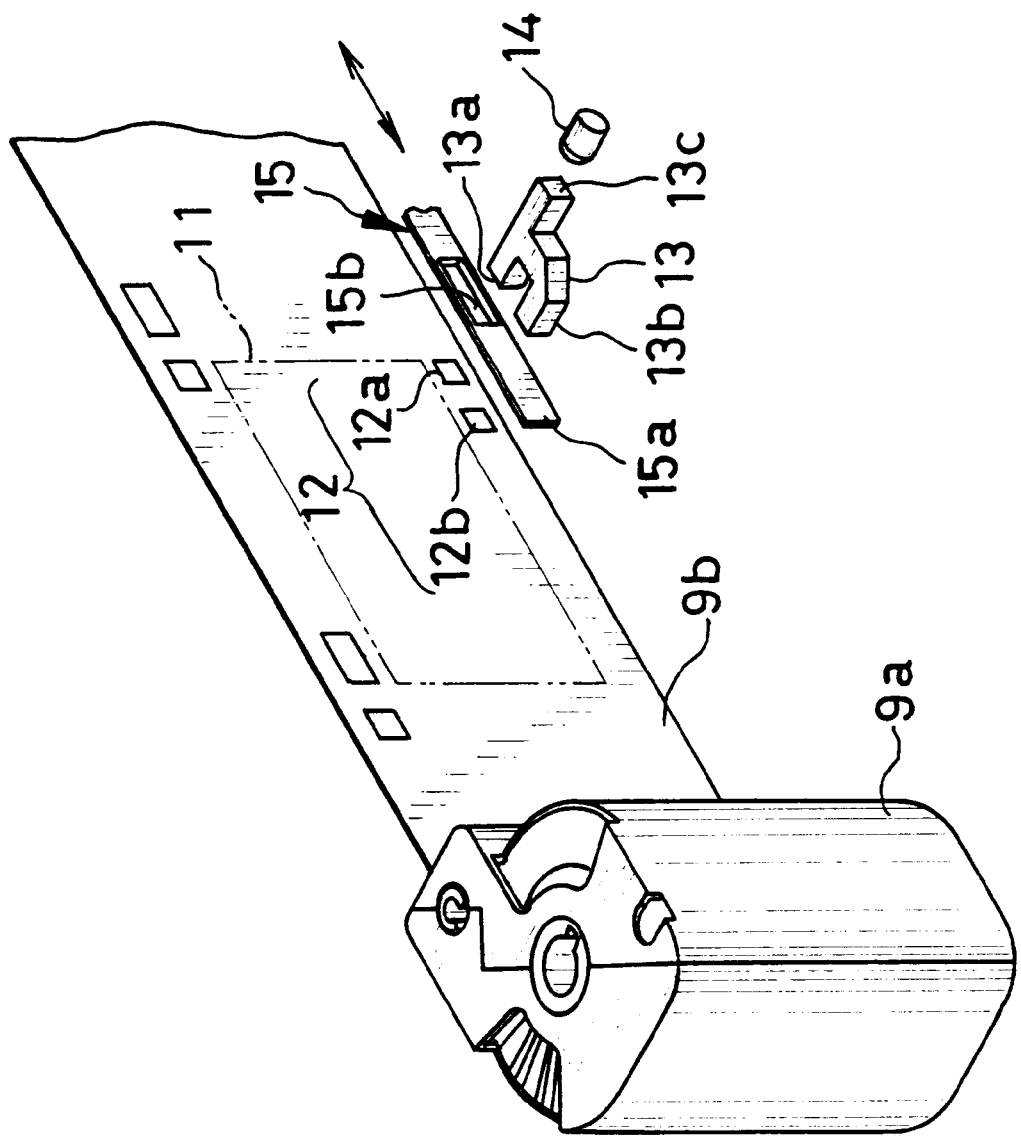
FIG. 2 is an explanatory view in perspective, illustrating a relationship between a photo film cassette and an optical data recorder device.
Figure 3:
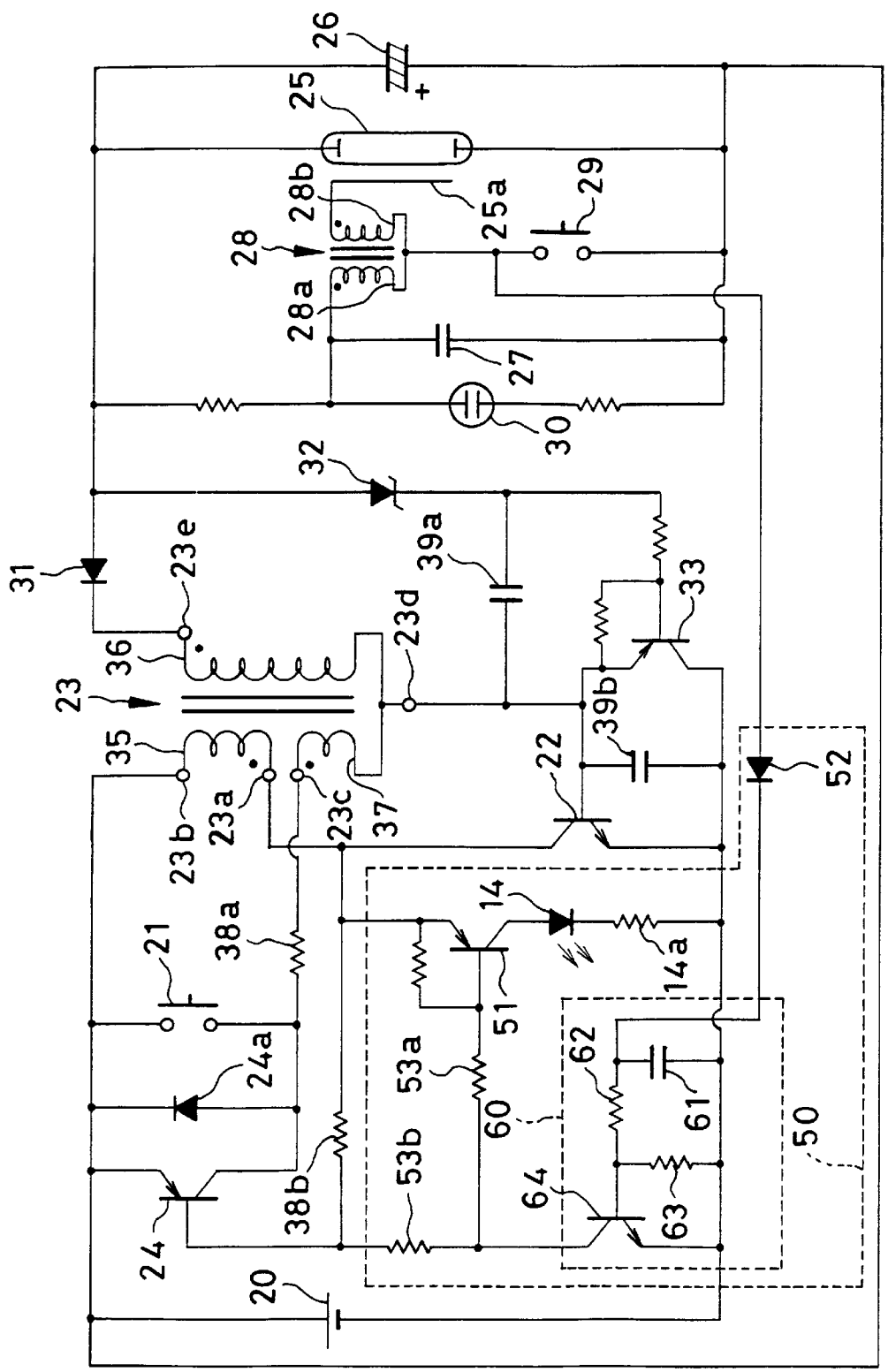
FIG. 3 is a block diagram schematically illustrating circuits of the lens-fitted photo film unit.

The photo film housing 1 incorporates a shutter blade 18 of FIG. 1A, a photo film winder mechanism (not shown), a flash circuit, an optical data recorder device 50 and a battery 20 (See FIG. 3). The battery 20 has electromotive force of 1.5 volts and supplies the circuits with power. The photo film housing 1 contains a cassette 9a, and is pre-loaded with unexposed photo film 9b which is drawn out of the cassette 9a and wound in a roll form in the course of manufacture of the photo film housing 1. See FIG. 2.

In FIG. 1A, an exposure-taking unit 40 has a lens holder 42, which covers the shutter blade 18 and also supports the taking lens 3. The taking lens 3 is covered by a lens cover 44.

The charger pushbutton 8 is located in the right side of the taking lens 3, to turn on a charger switch 21 illustrated in FIG. 3. There is a mode selector button 10 disposed between the charger pushbutton 8 and the flash emitter window 7.

The mode selector button 10 is adapted to selection of one of preset printing modes. The mode selector button 10 is slid to one of positions of H, P and C determined on a front surface of the lens-fitted photo film unit, so as to set the printing modes selectively.

When the mode selector button 10 is set in the position H, the H printing mode is selected. A frame exposed in the wide-vision (H) printing mode is designated to produce a photographic print at the H printing size of 89×158 mm. When the mode selector button 10 is set in the position P, the P printing mode is selected. A frame exposed in the panoramic (P) printing mode is designated to produce a photographic print at the P printing size of 89×252 mm. When the mode selector button 10 is set in the position C, the C printing mode is selected. A frame exposed in the classical (C) printing mode is designated to produce a photographic print at the C printing size of 89×127 mm. Note that the C printing size is the full-size, which is the most widely used format in the conventional photography.

The whole range of the viewfinder 4 is determined with a field of view corresponding to the printing range of the H printing mode. There are lines of a panoramic field of view observably disposed inside the viewfinder 4 to represent the printing range of the P printing mode. Also lines of a classical field of view are observably disposed inside the viewfinder 4 to represent the printing range of the C printing mode. It is to be noted that the viewfinder 4 may be constructed with a changeable observable range between the three manners, which may be selectively set in accordance with the selected one of the printing modes.

In FIG. 2, light from a photographic subject after passing the taking lens 3 is limited inside an exposure aperture having an aspect ratio of the H printing size, and becomes incident upon the photo film 9b. A latent image is created in a frame 11 which has a size of 15×26.7 mm substantially equal to that of the exposure aperture.

There is a light-guiding element 13 disposed under the exposure aperture for recording a PAR indicia 12. The PAR indicia 12 consists of first and second bits or dots 12a and 12b, and is located under the frame 11. The number of bits or dots in the recorded form of the PAR indicia 12 represents each of the printing modes, or represents the size of a photographic print to be produced from the frame 11 associated with the PAR inidicia 12.

The light-guiding element 13 has light-emitting surfaces 13a and 13b, which are directed toward the photo film 9b respectively for recording the two bits 12a and 12b. A front end of the light-guiding element 13 constitutes an entrance surface 13c, through which light from a light-emitting diode (LED) 14 enters the light-guiding element 13. The LED 14 constitutes an optical recorder unit. The LED 14 passed through the entrance surface 13c is split inside the light-guiding element 13 having two light paths, and guided to the light-emitting surfaces 13a and 13b.

There is a mask plate 15 disposed between the light-guiding element 13 and the photo film 9b and slidable with the mode selector button 10. The mask plate 15 includes a mask portion 15a and an opening 15b. When the mode selector button 10 is slid in the position H, the mask portion 15a of the mask plate 15 is set in a position confronted with the light-emitting surfaces 13a and 13b. When the mode selector button 10 is slid in the position P, the mask portion 15a is confronted with the light-emitting surface 13b, and the opening 15b in the mask plate 15 is confronted with the light-emitting surface 13a. When the mode selector button 10 is slid in the position C, the opening 15b is confronted with the light-emitting surfaces 13a and 13b.

The PAR indicia 12 is recorded in different manners between the printing modes defined by the position of the mask plate 15. In the P printing mode, the PAR indicia 12 only with the first bit 12a is recorded to the photo film 9b. In the C printing mode, the PAR indicia 12 with both the two bits 12a and 12b is recorded to the photo film 9b. In the H printing mode, neither of the two bits 12a and 12b is recorded.

Of course any suitable device constructed differently from the above may be used for recording the PAR indicia 12. For example two light-emitting diodes can be used respectively for positions of the two bits 12a and 12b of the PAR indicia 12.

In FIG. 3, electrical arrangement of the lens-fitted photo film unit is depicted. The flash circuit includes the charger switch 21, an oscillation transistor 22 which is an n-p-n transistor, an oscillation transformer 23, a latch transistor 24 or oscillation continuing transistor which is a p-n-p transistor, a flash discharge tube or xenon tube 25, a main capacitor 26, a trigger capacitor 27, a trigger transformer 28 as a booster, a trigger switch 29, a neon tube 30, a rectifier diode 31, a Zener diode 32 and a stop transistor 33 which is a p-n-p transistor. The main capacitor 26 is an electrolytic capacitor having polarity.

The oscillation transformer 23 is constituted by a primary winding 35, a secondary winding 36 and a tertiary winding 37, which are combined together in a manner of mutual-inductance coupling. The primary winding 35 has a first terminal 23a and a second terminal 23b. The secondary winding 36 has a fourth terminal 23d and a fifth terminal 23e. The tertiary winding 37 has the fourth terminal 23d common to the secondary winding 36, and also has a third terminal 23c.

The first terminal 23a of the oscillation transformer 23 is connected with a collector of the oscillation transistor 22. The second terminal 23b is connected with a positive electrode of the battery 20. The third terminal 23c is connected with a positive electrode of the battery 20 via a resistor 38a and the charger switch 21. The fourth terminal 23d is connected with a base of the oscillation transistor 22. The fifth terminal 23e is connected with a negative electrode of the main capacitor 26 via the rectifier diode 31. The rectifier diode 31 has such a direction that its cathode is on the fifth terminal 23e. The emitter of the oscillation transistor 22 is connected with a negative electrode of the battery 20, and grounded.

The oscillation transistor 22 and the oscillation transformer 23 connected therewith constitute a blocking oscillator, which converts a low voltage of the battery 20 to a high voltage, to charge the main capacitor 26 with the high voltage. The oscillation transistor 22, when the charger switch 21 is turned on, is supplied with a charging signal. In other words the battery 20 supplies the oscillation transistor 22 with a base current via the resistor 38a and the tertiary winding 37, to turn on the oscillation transistor 22. A collector current is caused to flow in the primary winding 35 as a current of the primary side. The base current of the oscillation transistor 22 increases according to the positive feedback from the oscillation transformer 23, so that the oscillation transistor 22 causes oscillation while the collector current is increased.

The latch transistor 24 causes the oscillation of the oscillation transistor 22 to continue by supplying the base of the oscillation transistor 22 with bias voltage even after the charger switch 21 is turned off. The emitter of the latch transistor 24 is connected with the positive electrode of the battery 20. The base of the latch transistor 24 is connected with the collector of the oscillation transistor 22 via a resistor 38b. The collector of the latch transistor 24 is connected with the base of the oscillation transistor 22 via the resistor 38a and the tertiary winding 37.

When the primary-side current from the primary winding 35 is saturated to cause back electromotive force in the oscillation transformer 23, there occurs a decrease in the current to the base of the oscillation transistor 22 from the oscillation transformer 23. The current to the collector of the oscillation transistor 22 also decreases. Once the oscillation transistor 22 starts operating, the latch transistor 24 is turned on. Even when the charger switch 21 is turned off, the collector current of the latch transistor 24 flows to the base of the oscillation transistor 22 as base current. Oscillation with the oscillation transistor 22 starts again after stop of the back electromotive force. The blocking oscillator including the oscillation transistor 22 is caused to continue oscillation by the positive feedback of the latch transistor 24.

A looping diode 24a is connected in parallel with the charger switch 21, and its cathode is connected with the positive electrode of the battery 20. A current loop is formed with the looping diode 24a in consideration of back electromotive force in the tertiary winding 37 generated when the charger switch 21 is turned off, for the purpose of eliminating instability in the oscillation of the blocking oscillator or avoiding an excessive length in the charging time.

During the oscillation with the oscillation transistor 22, electromotive force occurs in the secondary winding 36 at a high voltage according to a ratio between the numbers of the turns of the windings 35 and 36, for example 350 volts. Note that this electromotive force is predetermined higher than the Zener voltage of the Zener diode 32 to be described later. When this electromotive force occurs, the rectifier diode 31 supplies the main capacitor 26 with a secondary-side current flowing from the fifth terminal 23e to the fourth terminal 23d.

Electrodes of the main capacitor 26 are respectively connected with electrodes of the flash discharge tube 25. The positive electrode of the main capacitor 26 is connected with the positive electrode of the battery 20. The negative electrode of the main capacitor 26 is connected with the anode of the rectifier diode 31. The main capacitor 26 is charged in such a manner that a potential of the negative electrode of the main capacitor 26 is lowered with reference to a positive potential of the battery 20. In the present embodiment, the standard full-charged voltage across the main capacitor 26 is predetermined as 300 volts. It is possible to induce discharge in the flash discharge tube 25 at an intended designed light amount when the voltage across the main capacitor 26 is the standard full-charged voltage.

The trigger capacitor 27 is charged by the secondary-side current in the secondary winding 36 at the same time as the main capacitor 26 is charged. The trigger switch 29 is turned on when the shutter blade 18 of the shutter mechanism is fully open. Then the trigger capacitor 27 is discharged to cause a current from the trigger capacitor 27 to flow in a primary winding 28a of the trigger transformer 28. There occurs trigger voltage as high as 4 kV in a secondary winding 28b of the trigger transformer 28. The trigger voltage is applied to the main capacitor 26 via a trigger electrode 25a close to the flash discharge tube 25. The application of the trigger voltage causes the flash discharge tube 25 to discharge the main capacitor 26, so that the flash discharge tube 25 emits flash light.

The neon tube 30 is caused to illuminate in a blinking manner when the main capacitor 26 is charged up to 260 volts. This value of voltage is hereinafter referred to as indicating charged voltage. The light of the neon tube 30 is guided by light-guiding members to a position in the vicinity of an eyepiece portion of the viewfinder 4. A user of the lensfitted photo film unit is enabled by the blinking illumination of the neon tube 30 visually to recognize a state of standby for flash emission. Note that the indicating charged voltage is predetermined lower than a standard full-charged voltage. A photograph is taken not immediately upon the start of the blinking operation of the neon tube 30, but upon a change of the blinking to a higher frequency at a lapse of short time after the start of the blinking.

The Zener diode 32 and the stop transistor 33 are combined for stopping the charging operation of the flash circuit when the main capacitor 26 is charged up to the standard full-charged voltage. The Zener diode 32 is constructed with a Zener voltage of 300 volts in consideration of the main capacitor 26 of which the standard full-charged voltage is 300 volts.

The Zener current flows into the base of the stop transistor 33, to turn on the stop transistor 33. Upon turning on of the stop transistor 33, the base and the emitter of the oscillation transistor 22 are short-circuited, so that the oscillation transistor 22 is turned off. The latch transistor 24 is also turned off. The oscillation of the blocking oscillator is stopped to stop charging the main capacitor 26.

Auxiliary capacitors 39a and 39b are used for the purpose of delaying the stop of the blocking oscillator with reference to the reach of the voltage across the main capacitor 26 to the standard full-charged voltage. The auxiliary capacitor 39a stores charge in response to the start of the flow of the Zener current from the Zener diode 32, so as to delay the rise of the base voltage of the stop transistor 33 to its operating voltage. The auxiliary capacitor 39b stores charge to delay the fall of the base voltage of the oscillation transistor 22 down to a value smaller than its operating voltage after the stop transistor 33 is turned on. Consequently the main capacitor 26 stops being charged when the charged voltage across the main capacitor 26 becomes higher than the standard full-charged voltage. The charged voltage across the main capacitor 26 is prevented from being lower than the standard-full charged voltage by its internal discharge after the stop of the charging and before taking an exposure with flash emission.

The optical data recorder device 50 is a component essentially combined with the flash circuit, is supplied with power by the battery 20, emits light through the LED 14 and records the PAR indicia 12. To be precise, the blocking oscillator is operated each time that one exposure is taken. Pulsed voltage is generated in the oscillation of the blocking oscillator, and used during the lapse of time Ta. The pulsed voltage is applied to the LED 14 to drive it. The optical data recorder device 50 also operates for restarting charging of the main capacitor 26 after each exposure is taken.

The optical data recorder device 50 is constituted by the LED 14, a switching transistor or switching element 51 being a p-n-p transistor, a diode 52, a timer circuit 60 and the like. The timer circuit 60 is constituted by a timer capacitor 61, a resistor 62, a discharge resistor 63 and a timer transistor 64.

One electrode of the timer capacitor 61 is connected with the trigger switch 29 on the side of the trigger transformer 28 via the diode 52, and thus connected in series with a positive electrode of the battery 20 via the trigger switch 29.

The remaining electrode of the timer capacitor 61 is connected with a negative electrode of the battery 20, and grounded. The resistors 62 and 63 are connected in series with one another. A combination including the resistors 62 and 63 is connected in parallel with the timer capacitor 61. The base of the timer transistor 64 is connected to a line between the resistors 62 and 63. The emitter of the timer transistor 64 is grounded. The collector of the timer transistor 64 is connected by a resistor 53a with the base of the switching transistor 51, and connected by a resistor 53b with a base of the latch transistor 24.

The timer capacitor 61 is charged by the battery 20 when the trigger switch 29 is turned on by operation of taking an exposure. After this, the charged voltage of the timer capacitor 61 is divided by the resistors 62 and 63. The divided voltage is applied to the base of the timer transistor 64, to turn it on. The timer capacitor 61 is gradually discharged through the resistors 62 and 63 and the timer transistor 64 being turned on. The voltage across the timer capacitor 61 decreases, and when lowered to a predetermined value, the base voltage of the timer transistor 64 becomes lower than its operating voltage. So the timer transistor 64 becomes turned off. In short, the timer transistor 64 remains turned on only during the time Ta. The timer circuit 60 remains turned on during the same.

The timer transistor 64 operates for oscillation of the blocking oscillator irrespective of turning off of the charger switch 21, as the timer transistor 64 turns on the latch transistor 24. The operation of the blocking oscillator is continued until the main capacitor 26 comes to have the standard full-charged voltage. This is because the latch transistor 24 remains turned on by operation of the oscillation transistor 22 even when the timer transistor 64 is turned off.

The time Ta during which the timer transistor 64 is turned on depends on capacitance of the timer capacitor 61 and resistance of the resistors 62 and 63. The characteristics of the timer capacitor 61 and the resistors 62 and 63 are selected in consideration of sensitivity of the photo film 9b, intensity of the LED 14 and frequency of oscillation of the blocking oscillator. For example the time Ta is approximately 200 msec.

The resistors 62 and 63 operate further for discharging the timer capacitor 61 even after the timer transistor 64 is turned off. If the timer capacitor 61 is not discharged after the timer transistor 64 is turned off, then the discharge of the timer capacitor 61 is kept stopped in a state where the base voltage of the timer transistor 64 is slightly smaller than an operating voltage determined for turning on the timer transistor 64. However this state of incomplete discharge is likely to cause a problem. When the blocking oscillator operates next, the emitter potential or the grounded potential is fluctuated to raise the base voltage to a value equal to or more than the operating voltage.

Unacceptable recording of the PAR indicia 12 is likely to occur because of illumination of the LED 14 at an unintended time point, for example during a charging operation after the acceptable recording of the PAR indicia 12. To avoid such a problem, the resistors 62 and 63 are used to discharge the timer capacitor 61 completely even after the timer transistor 64 is turned off.

The diode 52 is connected by directing its cathode toward the timer circuit 60. Purposes of the diode 52 are to prevent the timer capacitor 61 from being charged with voltage of a direction reverse to that of turning on the timer transistor 64, and to protect the base of the timer transistor 64.

An emitter of the switching transistor 51 is connected with the first terminal 23a of the primary winding 35, or with the collector of the oscillation transistor 22. The LED 14 is connected in series with a current limiter resistor 14a and between the collector of the switching transistor 51 and a grounded line. The anode of the LED 14 in the connection is directed to the collector of the switching transistor 51. The LED 14 has a threshold voltage of 2.0 volts for example.

The potential of the first terminal 23a of the oscillation transformer 23 increases in a pulsed manner with reference to the ground potential that is the potential of the negative electrode of the battery 20, each time that back electromotive force occurs in the windings 35–37 of the oscillation transformer 23. Accordingly the oscillation transistor 22 is turned off each time. The voltage VCE between the collector and emitter of the oscillation transistor 22 increases in the pulsed manner to generate pulsed voltage. The switching transistor 51 is turned on each time that the pulsed voltage occurs while the timer transistor 64 remains turned on. The pulsed voltage is higher than the threshold voltage of the LED 14, and has a peak value of approximately 7 volts.

The LED 14 emits light when the pulsed voltage VCE is applied to it in the forward direction while the switching transistor 51 remains turned on. The LED 14 is driven repeatedly by the pulsed voltage generated during the time Ta of turning on of the timer circuit 60.

The operation of the above embodiment is described now. A user manually rotates the winder wheel 5 of the lens-fitted photo film unit, winds the photo film 9b, and stands by for taking an exposure. The shutter mechanism is charged by winding of the photo film 9b. Then the user slides the mode selector button 10 to set it in any one of the positions of the printing modes C, P and H.

If a photograph with flash is intended for the first time, the charger pushbutton 8 is depressed to turn on the charger switch 21. Also if the neon tube 30 does not illuminate upon lapse of long time after charging the main capacitor 26 due to natural discharge of the main capacitor 26 with time, then the charger pushbutton 8 is depressed. The charger pushbutton 8 may stop being depressed after a short time.

Figure 4:
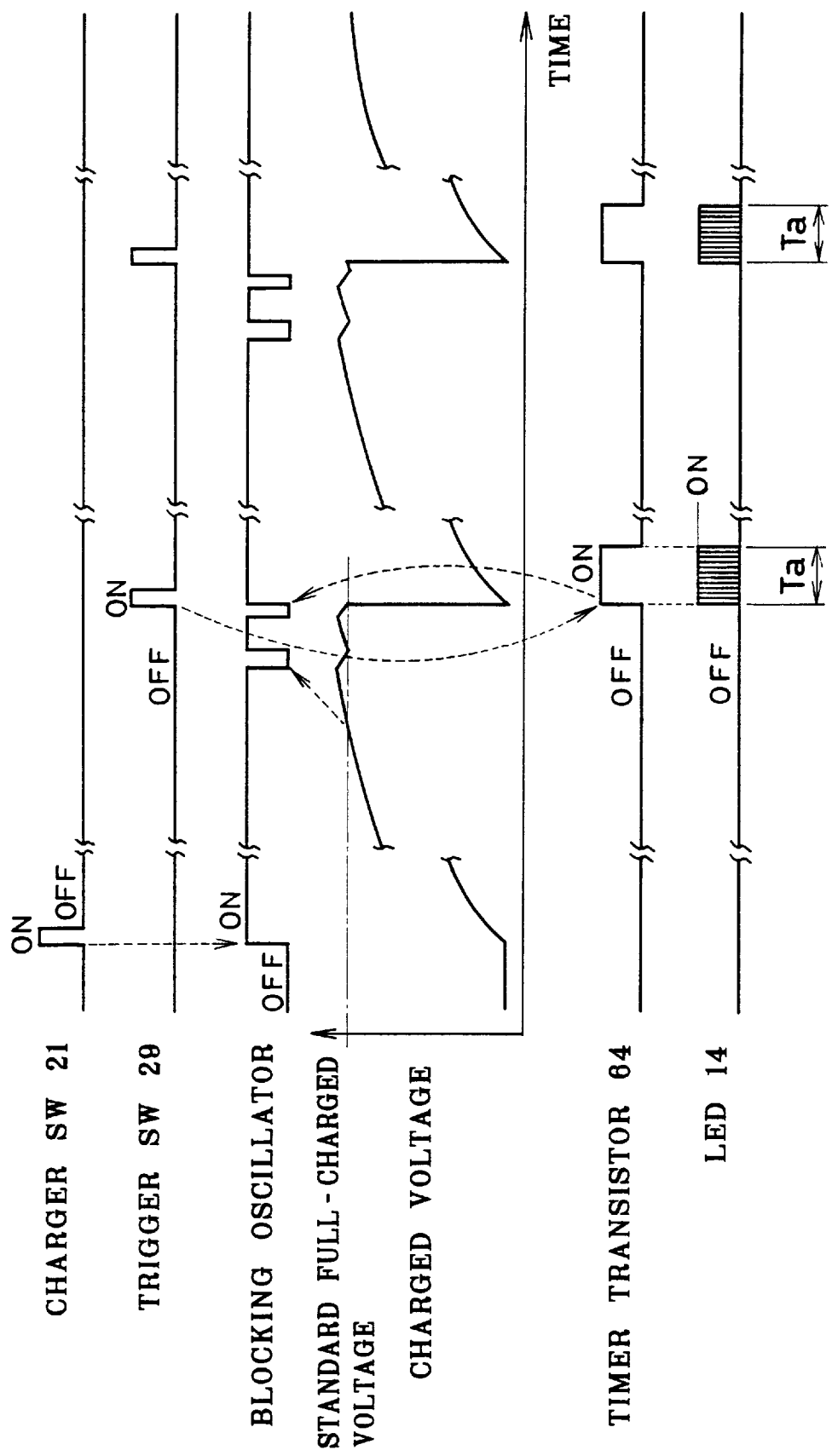
FIG. 4 is a timing chart illustrating operation of a flash circuit and the optical data recorder device.

When the charger switch 21 is turned on, a current flows from the battery 20 through the resistor 38a and the tertiary winding 37 to the base of the oscillation transistor 22 as a base current. The oscillation transistor 22 is turned on. See FIG. 4. The blocking oscillator including the oscillation transistor 22 and the oscillation transformer 23 is turned on to start oscillation. Also the oscillation transistor 22 is turned on. The collector current of the oscillation transistor 22 flows to the base of the latch transistor 24, which is turn ed on. Even after the user stops depressing the charger pushbutton 8, oscillation with the oscillation transistor 22 continues irrespective of turning off of the charger switch 21. The blocking oscillator operates continuously.

During the oscillation, the main capacitor 26 and the trigger capacitor 27 are charged via the rectifier diode 31 by the secondary-side current generated in the secondary winding 36 with electromotive force of high voltage. The secondary-side current flows from the fifth terminal 23e to the fourth terminal 23d.

The neon tube 30 starts its blinking operation of repeatedly turning on and off, when the charged voltage across the main capacitor 26 comes up to the indicating charged voltage. The blinking operation becomes the more quickly according to the increase in the charged voltage of the main capacitor 26. In the course of further charging, the charged voltage across the main capacitor 26 increases to the standard full-charged voltage. Then a Zener current flows in the Zener diode 32 to turn on the stop transistor 33. The operation of the oscillation transistor 22 is stopped by connection of its base with its emitter. Note that the auxiliary capacitors 39a and 39b operate so that the stop of the operation of the oscillation transistor 22 is later than the flow of the Zener current. Upon the stop of the oscillation transistor 22, the latch transistor 24 is turned off.

The main capacitor 26 stops being charged when the charged voltage across it becomes slightly higher than the standard full-charged voltage upon the stop of the blocking oscillator. Of course the blocking oscillator does not start after the stop transistor 33 is turned off with the stop of the Zener current, because the charger switch 21 is turned off.

The user recognizes the quick blinking of the neon tube 30, aims at a photographic subject with the viewfinder, and depresses the shutter release button 6 to take an exposure. When the shutter release button 6 is depressed, the shutter mechanism operates. Upon the movement of the shutter blade 18 to its fully open position, the trigger switch 29 is turned on. The trigger capacitor 27 is discharged to cause a current to flow in the primary winding 28a of the trigger transformer 28. Trigger voltage occurs in the secondary winding 28b, and is applied to the flash discharge tube 25 by the trigger electrode 25a. The main capacitor 26 is discharged for the flash discharge tube 25 to illuminate. Note that, if the main capacitor 26 has not been charged to its predetermined sufficient voltage, no flash light is emitted.

The shutter mechanism is actuated. The subject light through the taking lens 3 becomes incident upon the photo film 9b set behind the exposure aperture. A latent image is created in the frame 11 of which the size is irrespective of selection of the printing modes.

When the trigger switch 29 is turned on, the timer capacitor 61 is instantaneously charged fully by the battery 20, because the timer capacitor 61 becomes connected with the battery 20 irrespective of existence of flash light. The charged voltage of the timer capacitor 61 is divided by the resistors 62 and 63, so that the divided voltage is applied to the base of the timer transistor 64. The timer transistor 64 is turned on. In response to this, a current flows to the base of the latch transistor 24, which is also turned on.

When the latch transistor 24 is turned on, a current flows from the battery 20 to the base of the oscillation transistor 22, which is turned on. The blocking oscillator starts operation to charge the main capacitor 26.

Figure 5:
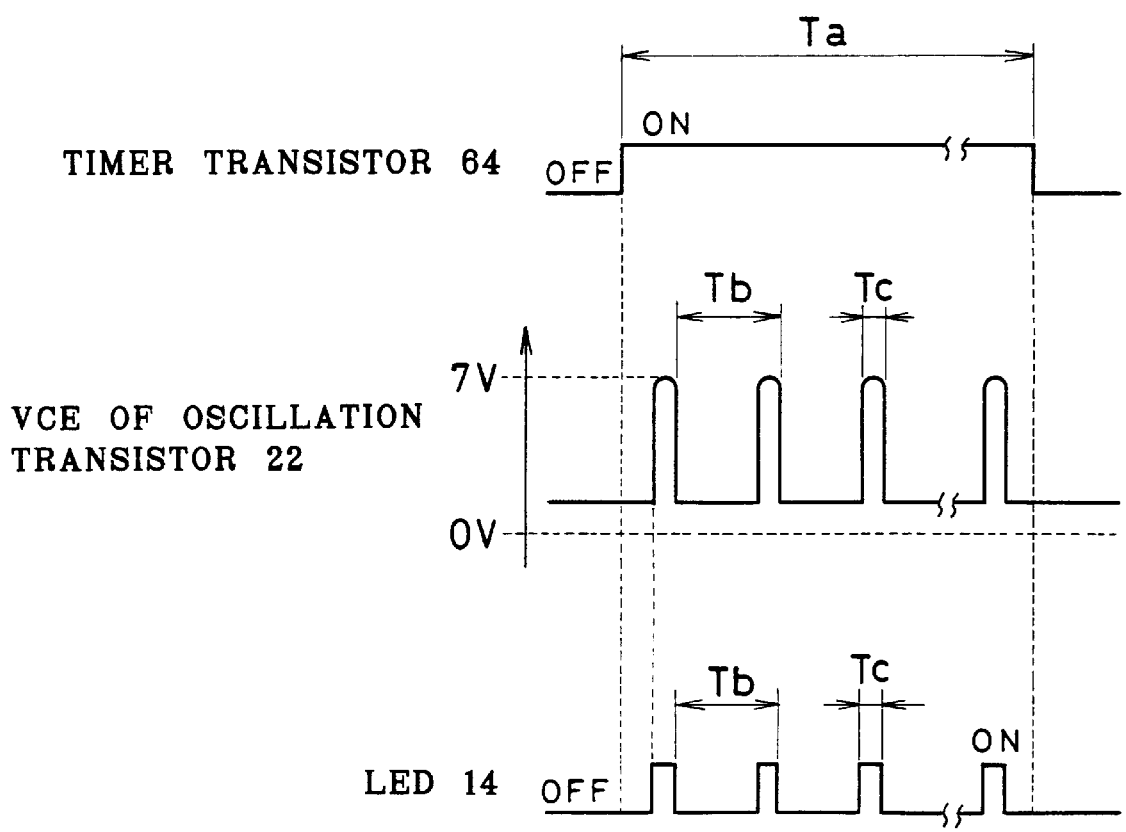
FIG. 5 is a timing chart illustrating operation of the optical data recorder device.

Electromotive force and back electromotive force are generated in the oscillation transformer 23 alternately and repeatedly during the oscillation of the blocking oscillator. In the course of occurrence of the back electromotive force, the oscillation transistor 22 is turned off. The pulsed voltage VCE is generated between the collector and emitter of the oscillation transistor 22 in a pulsed manner depicted in FIG. 5. The switching transistor 51 is turned on by the pulsed voltage. In the LED 14, the current flows in its forward direction, so that the LED 14 emits light while being supplied with the pulsed voltage. The LED 14 illuminates repeatedly in the repeated application of the pulsed voltage while the timer transistor 64 is kept turned on.

The base voltage of the timer transistor 64 decreases in the course of the discharge of the timer capacitor 61. The timer transistor 64 is turned off when the time Ta elapses after turning on of the trigger switch 29. The base currents to the latch transistor 24 and to the switching transistor 51 stop being supplied by the timer circuit 60. But the latch transistor 24 remains turned on continuously because supplied with the base current from the oscillation transistor 22. The blocking oscillator continues the oscillation irrespective of turning off of the timer transistor 64, to continue charging the main capacitor 26 until it comes to have the standard full-charged voltage. After the timer transistor 64 is turned off, the timer capacitor 61 is completely discharged by the resistors 62 and 63. The timer transistor 64, therefore, is kept turned off after the lapse of the time Ta.

In continuing the oscillation of the blocking oscillator, the pulsed voltage occurs between the collector and emitter of the oscillation transistor 22. But the switching transistor 51 remains turned off, because no base current to the switching transistor 51 flows from the timer circuit 60. The LED 14 stops illuminating. As a result, the LED 14 has illuminated only during the time Ta in a repeated manner with the pulsed voltage.

Light emitted by the LED 14 is introduced by the light-guiding element 13 from the entrance surface 13c to the light-emitting surfaces 13a and 13b. The light emitted from the light-emitting surfaces 13a and 13b imprints the PAR indicia 12 to the photo film 9b in accordance with the printing mode selected by the mode selector button 10.

Figure 6:
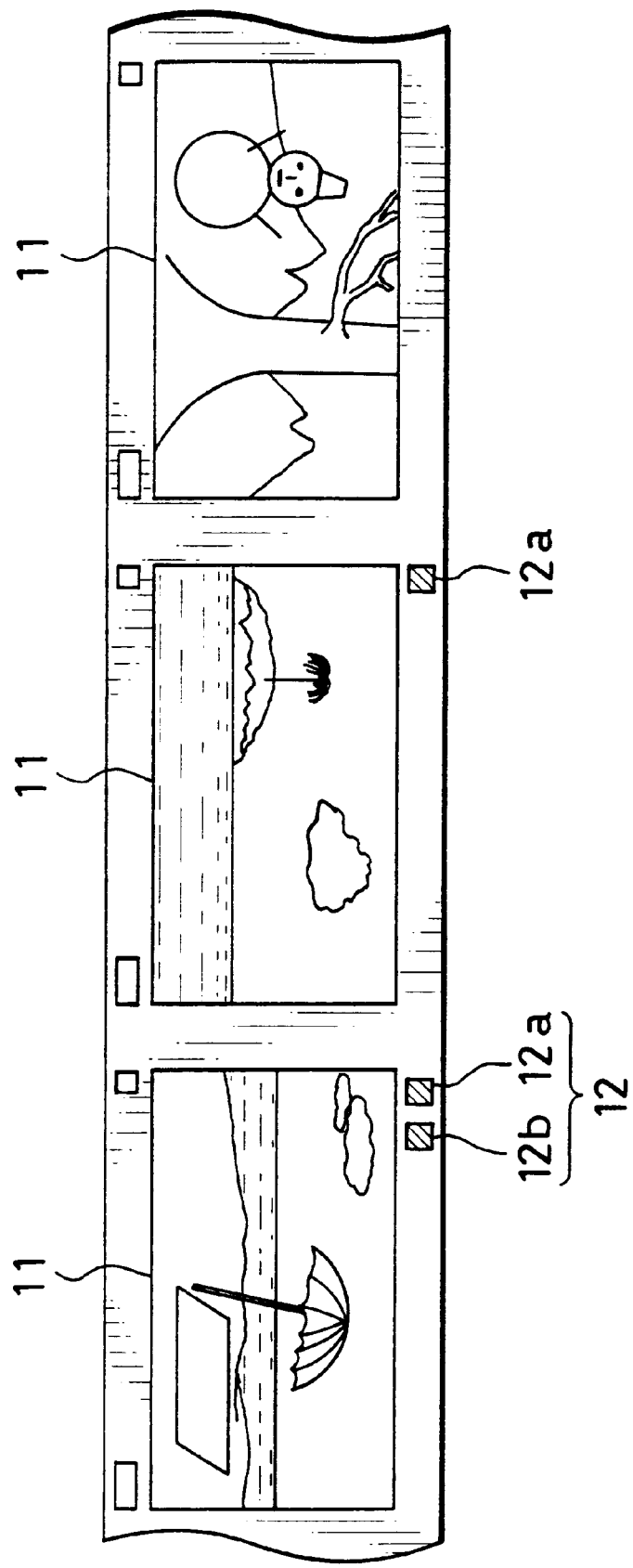
FIG. 6 is an explanatory view in plan, illustrating exposed photo film obtained from the lens-fitted photo film unit.

If the C printing mode is designated, the opening 15b in the mask plate 15 is positioned directly behind the light-emitting surfaces 13a and 13b. See the frame located left-hand in the photo film of FIG. 6. The PAR indicia 12 with the two bits 12a and 12b for the C printing size is recorded to the photo film 9b under the frame 11. In the P printing mode, the mask portion 15a of the mask plate 15 is positioned behind the light-emitting surface 13b. See the frame located in the center in the photo film of FIG. 6. The PAR indicia 12 with only the first bit 12a for the P printing size is recorded under the frame 11. In the H printing mode, the mask portion 15a of the mask plate 15 is positioned behind the light-emitting surfaces 13a and 13b. See the frame located right-hand in the photo film of FIG. 6. No PAR indicia 12 is recorded under the frame 11 for the H printing size.

Let Tb be a period of the oscillation of the blocking oscillator, namely a period at which the LED 14 illuminates due to occurrence of the back electromotive force in the oscillation transistor 22. See FIG. 5. The illuminating period Tb is influenced by the charged voltage across the main capacitor 26. The main capacitor 26, after the flash light is emitted, has the remaining voltage of approximately 50 volts. The oscillation period Tb is approximately 0.5 msec. Let Tc be a time of each occurrence of the pulsed voltage or time during which the LED 14 emits light continuously. The time Tc is approximately 10 μsec. As a result the LED 14 emits light approximately for 400 times while the timer transistor 64 remains turned on in the time Ta=200 msec.

Consequently the PAR indicia 12 can be recorded with a sufficient light amount greater than that in an alternative technique in which the LED is driven repeatedly while the trigger switch 29 is turned on. The exposure amount of the PAR indicia 12 is kept unchanged, as the time Ta is kept substantially constant irrespective of irregularity in the time during which the trigger switch 29 is turned on.

If another exposure is desired immediately after taking the initial exposure, the charger pushbutton 8 does not require being depressed, because the main capacitor 26 has been automatically charged to the standard full-charged voltage. If the charged voltage across the main capacitor 26 has decreased by the natural discharge, the charger pushbutton 8 is depressed again to cause the neon tube 30 to illuminate before taking an exposure. Each time that one exposure is taken, the PAR indicia 12 is recorded.

When all frames are exposed on the photo film 9b, the photo film 9b is developed in a photo laboratory, before photographic prints are produced. As the PAR indicia 12 is recorded with the sufficient light amount, the two bits 12a and 12b have sufficient density. There does not occur failure in reading the PAR indicia 12.

Figure 7:
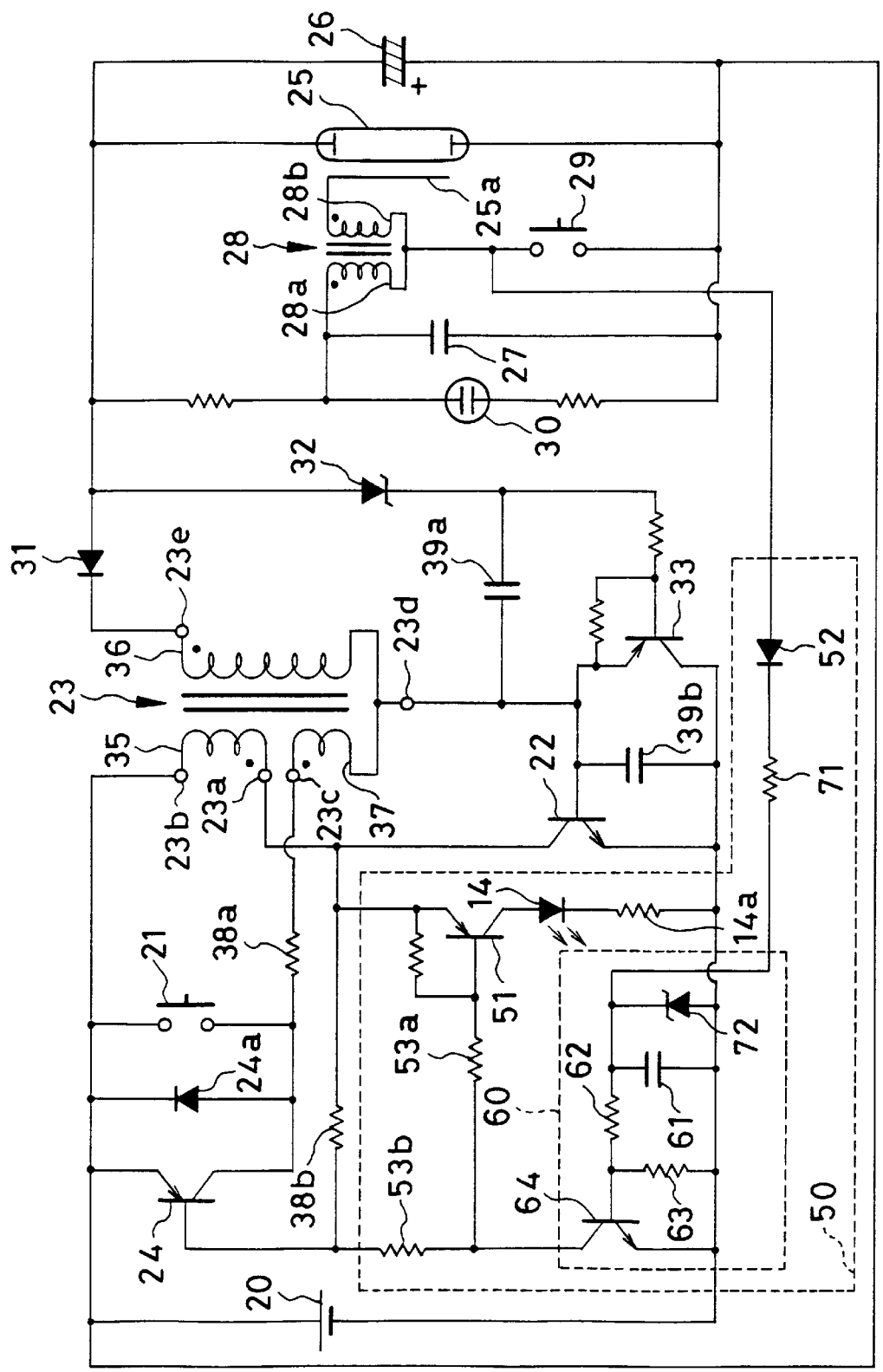
FIG. 7 is a block diagram schematically illustrating other preferred circuits, in which a Zener diode is used for limiting charged voltage of a timer capacitor.

In FIG. 7, another preferred embodiment is illustrated, in which irregularity in an exposure amount for the PAR indicia is reduced by reducing irregularity in the time for keeping the timer circuit turned on. Elements similar to those of FIG. 3 are designated identical reference numerals.

In FIG. 7, the diode 52 of the optical data recorder device 50 is connected in series with a resistor 71. There is a Zener diode 72 connected in parallel with the timer capacitor 61 with reference to the battery 20.

The resistor 71 reduces a current flowing in the diode 52, for the purpose of reducing a drop of the voltage across the diode 52 in the forward direction. This prevents the charged voltage across the timer capacitor 61 from decreasing even through a considerably great current flows. The resistor 71 has resistance of for example 100Ω. The drop in the voltage is reduced to approximately 0.7 volt by the diode 52 as a lower value than 0.9 volt which is the drop in the voltage at the diode 52 without the resistor 71.

The Zener diode 72 has an anode being grounded, and is connected as a limiter circuit. The Zener diode 72 prevents the charged voltage across the timer capacitor 61 from being higher than is required, and stabilizes the charged voltage. Zener voltage of the Zener diode 72 is for example 3 volts in consideration of resistance of the Zener diode 72 to its operation.

Accordingly the charged voltage across the timer capacitor 61 is regularized at the time of turning on the trigger switch 29. The voltage of the timer capacitor 61 at the time of starting the discharge is constant. The time Ta during which the timer transistor 64 is turned on to set the timer circuit 60 in the on-state depends on the voltage upon the start of discharging the timer capacitor 61. As a result the time Ta is regulated in a constant manner. In the present embodiment the irregularity of the time Ta=200 msec is reduced to a limited range of ±10%.

It is to be noted that, in the above embodiments, the Zener diode 32 characteristically has a small resistance to its operation. The auxiliary capacitors 39a and 39b are used. Alternatively the Zener diode 32 having a large resistance to its operation may be used. This makes it possible to omit the auxiliary capacitors 39a and 39b, because the turning on of the stop transistor 33 can be delayed due to the large resistance of the Zener diode 32 itself without using the auxiliary capacitors 39a and 39b. Note that, in general, a Zener diode as a part having lead terminals has small resistance to its operation. The chip type of Zener diode has large resistance to its operation.

Figure 8:
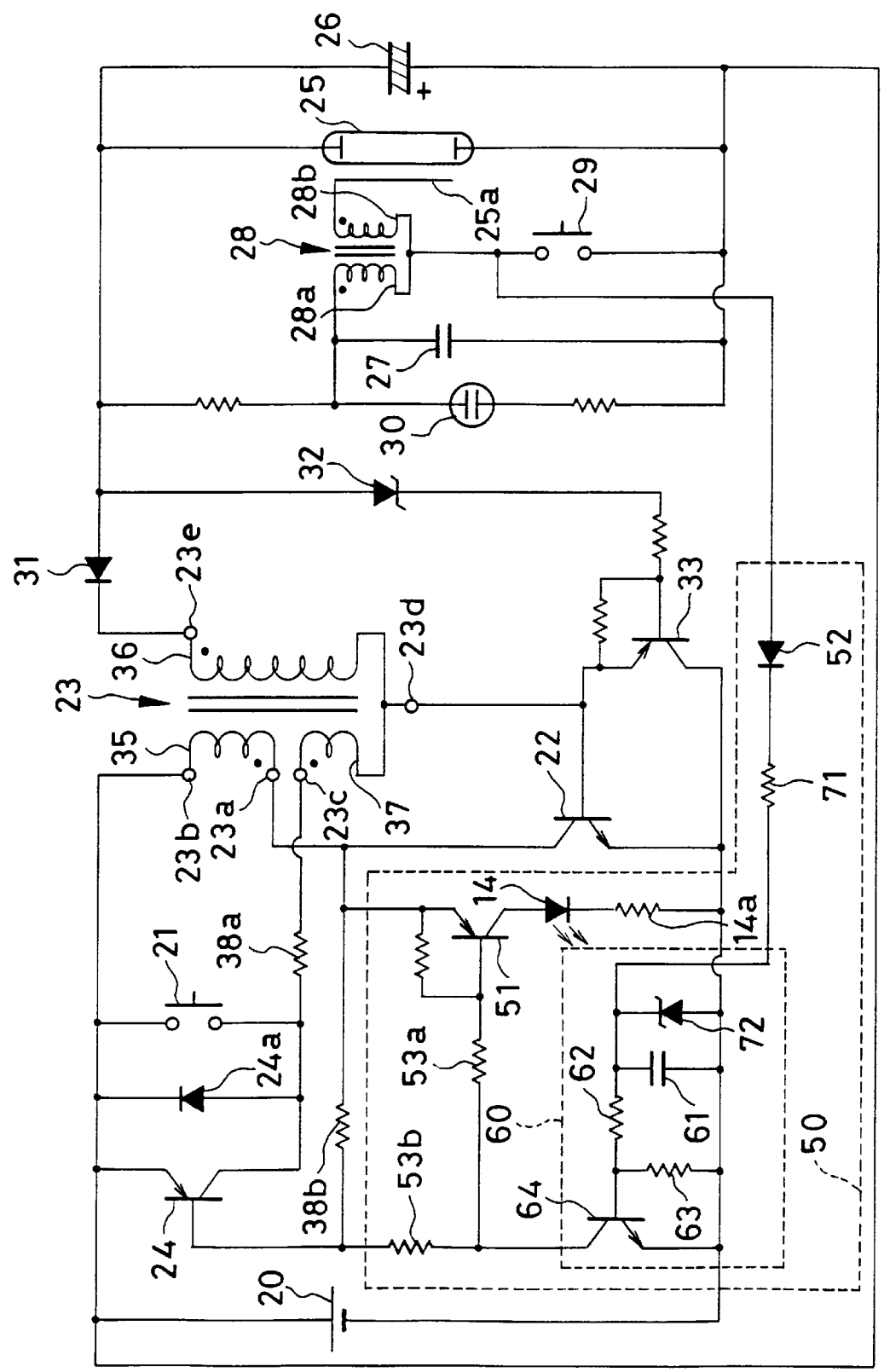
FIG. 8 is a block diagram schematically illustrating other preferred circuits, in which no auxiliary capacitors are used for stopping charging operation with a delay.

In FIG. 8, an embodiment without the auxiliary capacitors 39a and 39b is illustrated. The Zener diode 32 has large resistance to its operation, and may be a chip type. The use of this type of the Zener diode 32 makes it possible to reduce the cost of the parts, because of absence of the auxiliary capacitors 39a and 39b.

Figure 9:
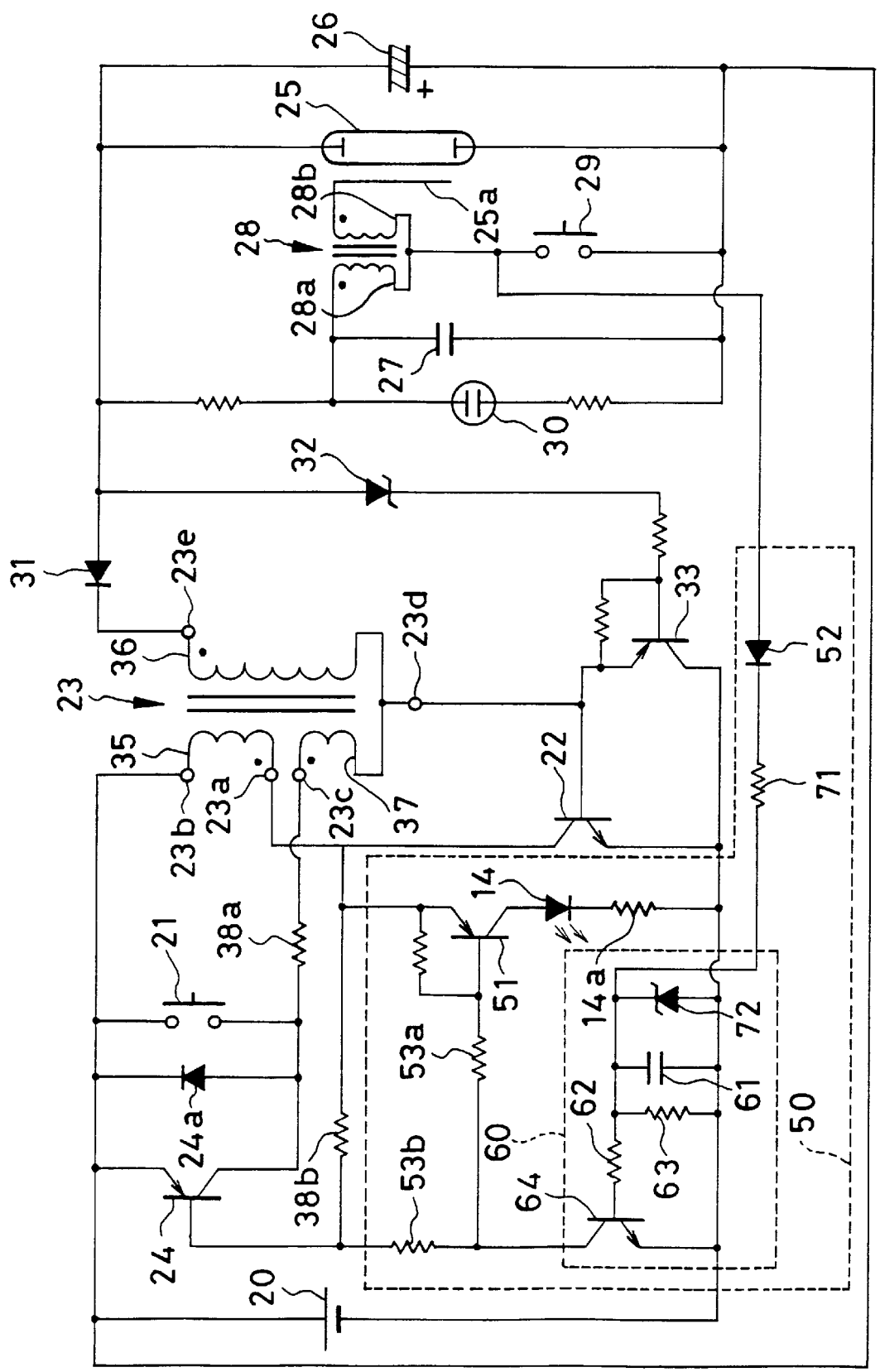
FIG. 9 is a block diagram schematically illustrating other preferred circuits, in which resistors are connected differently in relation to a timer circuit.

In FIG. 9, a preferred embodiment partially different from that of FIG. 7 is illustrated, in which the timer transistor can be turned on even when the electromotive force of the battery is lowered at a low temperature, after long use, or for any causes. In FIG. 9, there is a change in connection of the resistors 62 and 63 in the timer circuit 60. The base voltage of the timer transistor 64 is obtained through the resistor 62 from the charged voltage of the timer capacitor 61. The discharge resistor 63 is connected for the purpose of discharging the timer capacitor 61 while the timer transistor 64 is turned off. Of course elements similar to those in FIG. 8 are designated with identical reference numerals.

It is possible to keep high the level of in the voltage applied to the base 64 without changing the common use of the timer capacitor 61 in a manner more reliable than the constructions of FIGS. 3, 7 and 8. The timer transistor 64 can be turned on reliably if the electromotive force of the battery 20 is low, or the charged voltage across the timer capacitor 61 is low.

Figure 10:
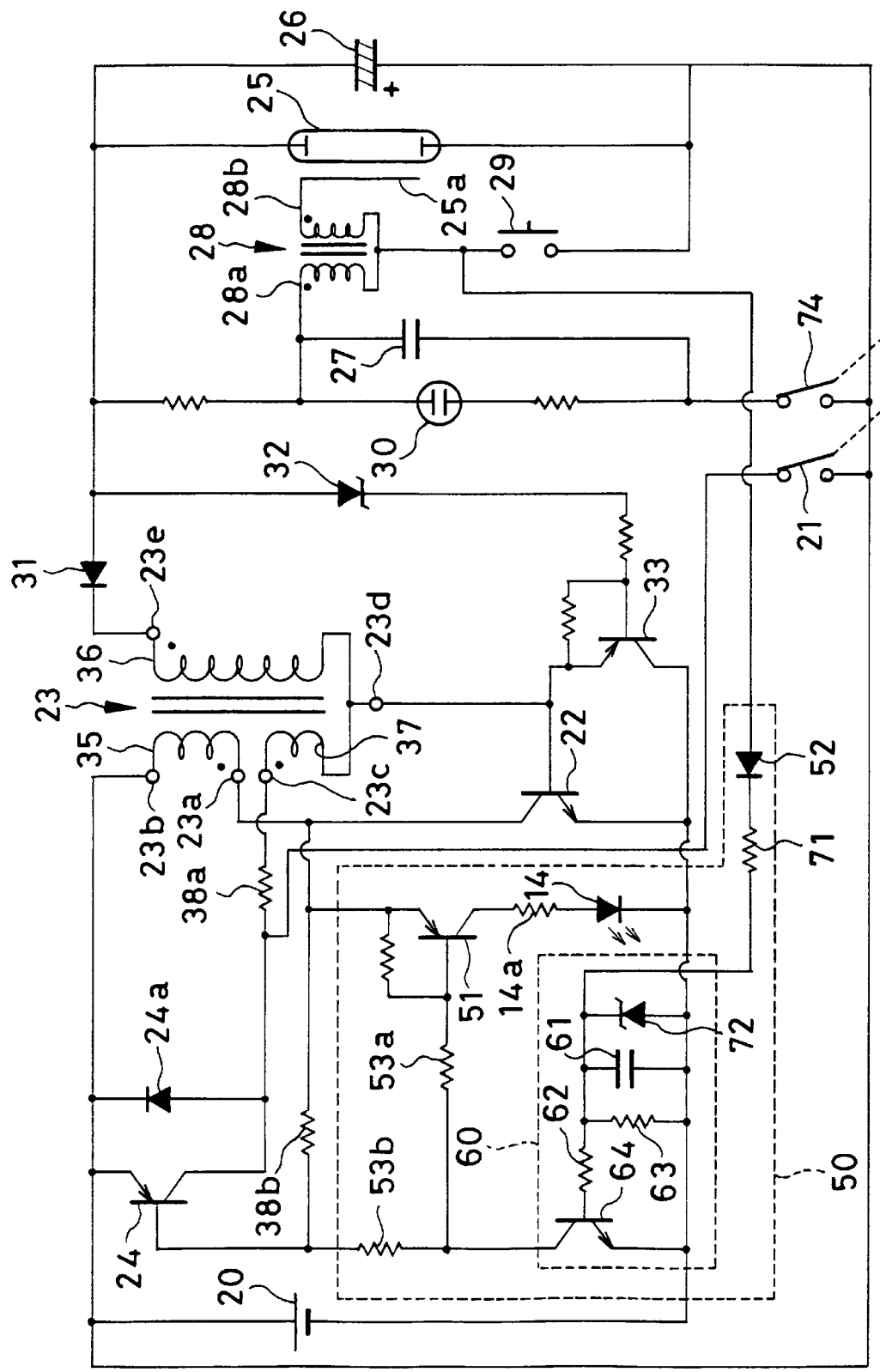
FIG. 10 is a block diagram schematically illustrating other preferred circuits including a flash set switch.

In FIG. 10, another preferred embodiment is illustrated, in which a flash set switch is added for selecting existence and absence of flash emission. Elements similar to those of FIG. 9 are designated with identical reference numerals. The lens-fitted photo film unit of FIG. 10 has a slidable charger lever (not shown), not the charger pushbutton 8 for starting the charging. The charger lever is slidable selectively in ON- and OFF-positions. The charger switch 21 is changed over in either one of the ON- and OFF-states in compliance with the positions of the charger lever. Of course the charger switch 21 is turned on when the charger lever is in the ON-position.

A flash set switch 74 is disposed in a manner turned on and off by operation of a slidable charger lever. When the charger lever is in an ON-position, the flash set switch 74 is turned on. In other words the charger switch 21 and the flash set switch 74 are turned on only at the same time. The trigger capacitor 27 and the neon tube 30 are connected with the positive electrode of the battery 20 via the flash set switch 74.

If a photograph with flash light is intended, the slidable charger lever is set in the ON-position. An exposure is taken after the main capacitor 26 is charged up to the standard full-charged voltage. When the charger lever is set in the ON-position, the charger switch 21 is turned on. In a manner similar to FIG. 9, the main capacitor 26 starts being charged until it is charged to the standard full-charged voltage. When the trigger switch 29 is turned on, the trigger capacitor 27 is discharged because the flash set switch 74 also remains turned on. The flash light is emitted.

If no use of flash light is intended, the slidable charger lever is set in the OFF-position for taking an exposure. Note that the charger lever may be slid while the main capacitor 26 is being charged or after the main capacitor 26 is fully charged. When the charger lever is set in the OFF-position, no flash is emitted even though the trigger switch 29 is turned on, because the flash set switch 74 remains turned off not to discharge the trigger capacitor 27.

If the charger switch 21 is turned off in the course of charging, the main capacitor 26 is charged to the standard full-charged voltage by the feedback operation of the latch transistor 24. But there is no flash emitted. The setting of the charger lever to the OFF-position keeps the flash set switch 74 turned off. The neon tube 30 does not illuminate even when the main capacitor 26 is charged to the standard full-charged voltage. There is no waste of charge stored in the main capacitor 26, as the neon tube 30 does not discharge the main capacitor 26.

In the present embodiment the Zener diode 32 characteristically has a small resistance to its operation. The auxiliary capacitors 39a and 39b do not exist. When the charger lever is kept in the ON-position, the main capacitor 26 is charged to the standard full-charged voltage. Once the oscillation transistor 22 is turned off, immediately the charged voltage across the main capacitor 26 decreases. The Zener current stops flowing in the Zener diode 32, so that a current flows from the charger switch 21 to the base of the oscillation transistor 22. The oscillation transistor 22 is turned on. After the main capacitor 26 is charged to the standard full-charged voltage, the oscillation of the blocking oscillator is continued so as to keep the main capacitor 26 at the standard full-charged voltage.

When the trigger switch 29 is turned on upon each exposure, the timer transistor 64 is kept turned on for the time Ta irrespective of the state of the flash set switch 74 for the use of flash light. The LED 14 is driven each time that back electromotive force occurs in the primary winding 35. The PAR indicia 12 is recorded to the photo film 9b.

Even if the flash set switch 74 is turned off after fully charging the main capacitor 26, the pulsed voltage can cause the LED 14 to emit light when an exposure is taken. This is because the timer transistor 64 is turned on after fully charging the main capacitor 26, and causes oscillation to generate the pulsed voltage. The PAR indicia 12 therefore can be reliably recorded.

It is also possible to provide the camera with a switching structure for keeping voltage of the main capacitor 26 from being applied to the Zener diode 32 to stop operation of the flash device, in addition to the selectable construction between the existence and absence of flash emission. This makes it possible to cause the blocking oscillator to operate continuously while the timer transistor 64 is turned on without being influenced by the resistance of the Zener diode 32 to its operation or existence and absence of the auxiliary capacitors 39a and 39b. The LED 14 can be driven for illumination.

Figure 11:
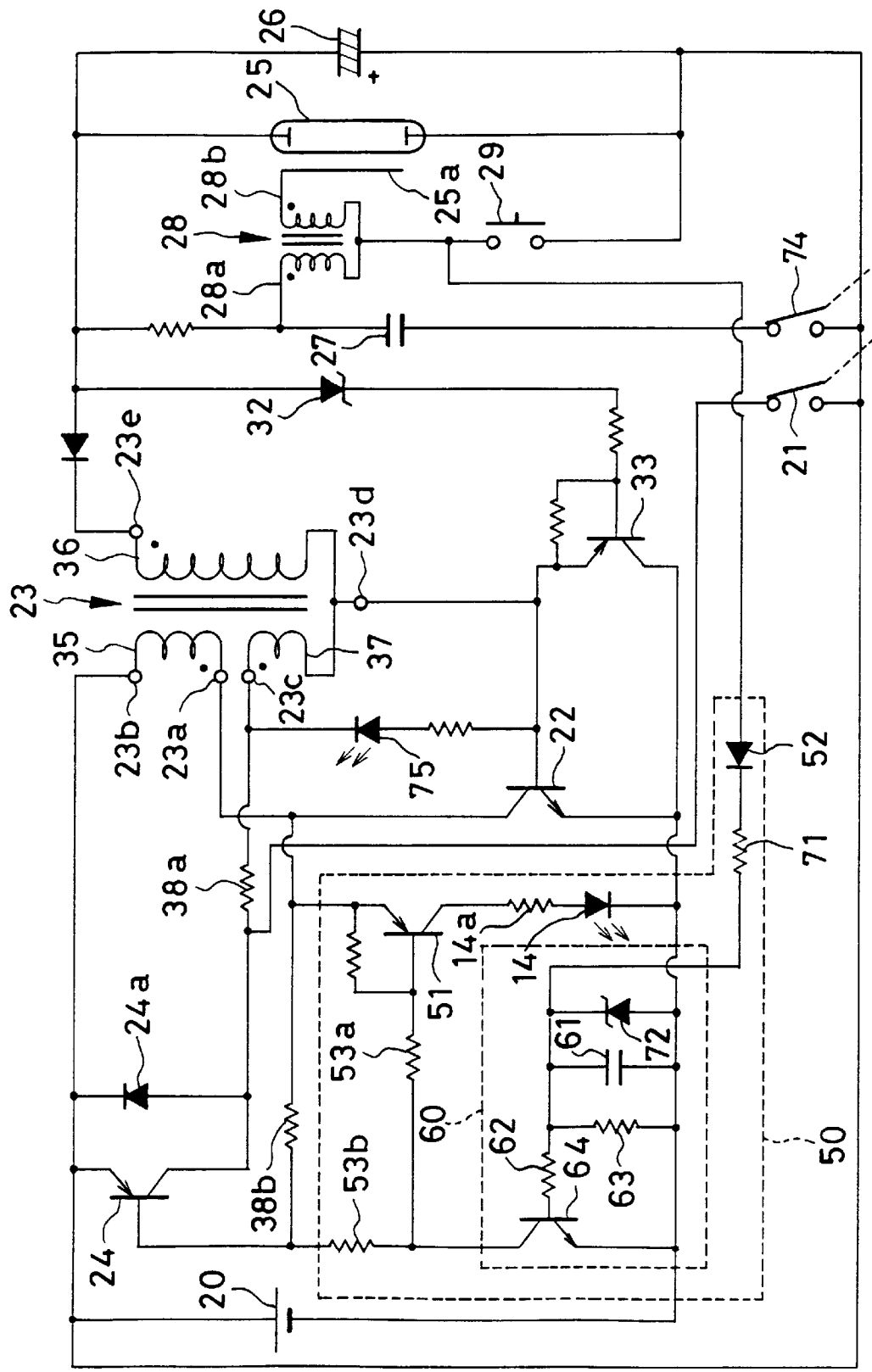
FIG. 11 is a block diagram schematically illustrating other preferred circuits including a finish indicator light-emitting diode.

In FIG. 11, a preferred embodiment is illustrated, in which a finish indicator light-emitting diode is used instead of the neon tube for indication of the finish of the charging. Except for this, the circuit of FIG. 11 is the same as that of FIG. 10. A finish indicator light-emitting diode 75 is connected between the third terminal 23c and the fourth terminal 23d of the oscillation transformer 23 and in series with a current limiter resistor 75a. The finish indicator LED 75 has such a direction that its cathode is connected with the third terminal 23c.

In the course of increase in the charged voltage of the main capacitor 26, the potential of the third terminal 23c of the tertiary winding 37 decreases gradually. The finish indicator LED 75 is supplied with voltage in its forward direction when the potential of the third terminal 23c becomes lower than that of the fourth terminal 23d. Before the main capacitor 26 comes to have the indicating charged voltage, the finish indicator LED 75 does not emit light because the potential difference is too small.

When the main capacitor 26 is charged to the indicating charged voltage, the difference in the potential between the third terminal 23c and the fourth terminal 23d sufficiently increases, so the finish indicator LED 75 emits light. The finish indicator LED 75 does not emit light while back electromotive force occurs in the tertiary winding 37. During the increase in the charged voltage across the main capacitor 26 from the indicating charged voltage to the standard fullcharged voltage, the potential difference increases, and the blinking period decreases. When the charged voltage comes up to the standard full-charged voltage, the finish indicator LED 75 illuminates at a constant light amount, as the frequency of the oscillation of the blocking oscillator is kept high by the Zener diode 32 and the stop transistor 33.

The finish indicator LED 75, therefore, can inform that the main capacitor 26 has finished being charged. The LED 14 is driven after the trigger switch 29 is turned on, in a manner similar to FIG. 10. The PAR indicia 12 can be recorded reliably.

Figure 12:
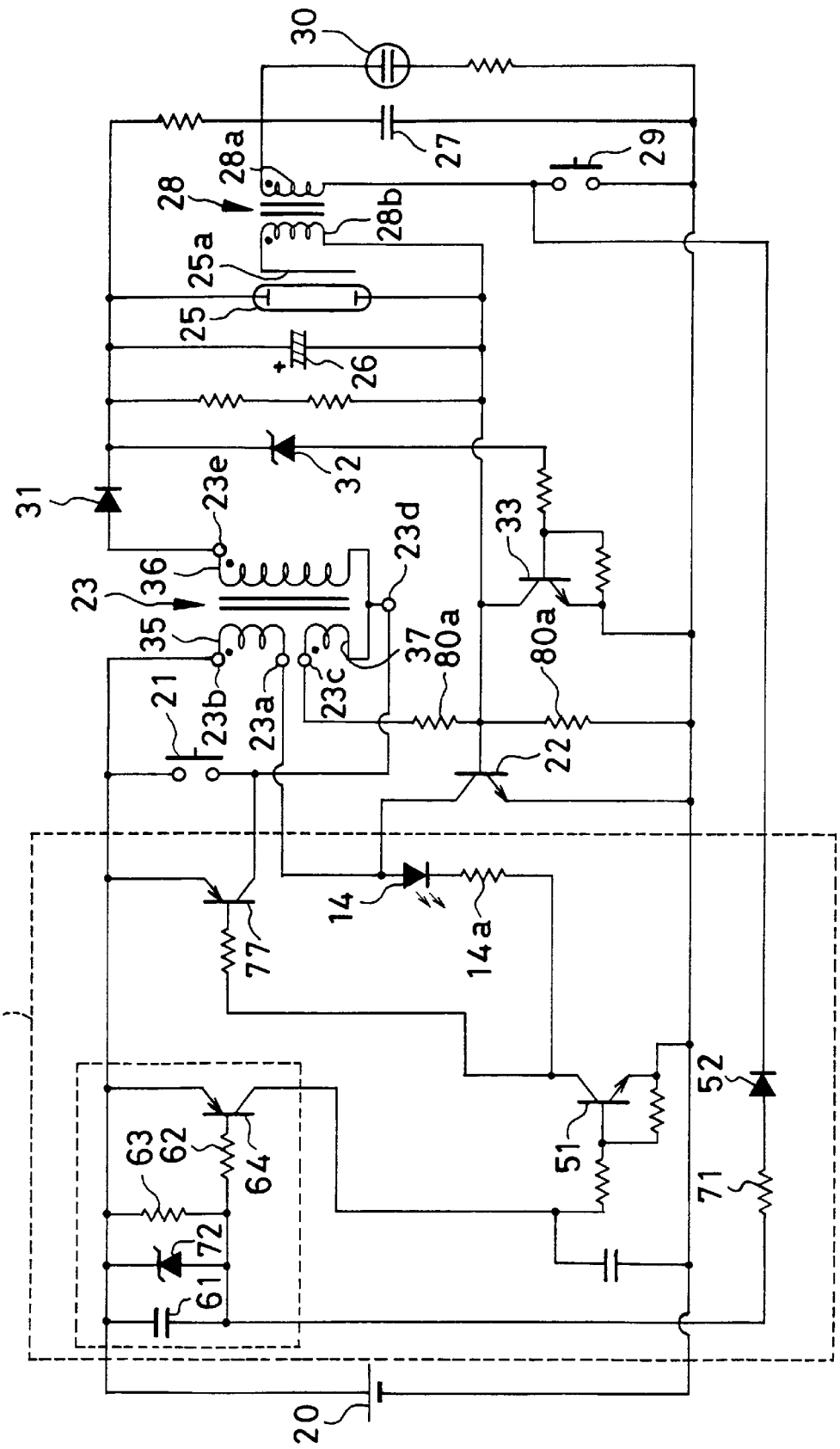
FIG. 12 is a block diagram schematically illustrating other preferred circuits, in which a main capacitor is positively charged and including a different transistor for continuing the oscillation.

In FIG. 12, still another preferred embodiment is depicted, in which an optical data recorder device for the PAR indicia is associated with a flash circuit which charges a main capacitor in a positive charging manner. Elements similar to those of the above embodiments are designated with identical reference numerals in FIG. 12.

In FIG. 12, the oscillation transistor 22 and the oscillation transformer 23 constitute the blocking oscillator. The oscillation transistor 22 has the collector connected with the first terminal 23a and in series with the primary winding 35 and the positive electrode of the battery 20. The oscillation transistor 22 has the emitter connected with the negative electrode of the battery 20, and grounded. The primary winding 35 is wound in a direction reverse to that in which the primary winding included in the constructions of FIGS. 3 and 7, for the purpose of charging operation in the positive charging manner. The base of the oscillation transistor 22 is connected to a line between resistors 80a and 80b, which are connected in series with each other between the third terminal 23c of the tertiary winding 37 and the grounded point. Also the base of the oscillation transistor 22 is connected with the negative electrode of the main capacitor 26. The fourth terminal 23d is connected with the positive electrode of the battery 20 via the charger switch 21.

The positive electrode of the main capacitor 26 is connected with the fifth terminal 23e of the secondary winding 36 via the rectifier diode 31. The anode of the rectifier diode 31 is directed toward the fifth terminal 23e in connection. The charger switch 21 is the type mechanically the same as that of the first embodiment, and is turned on only while the charger pushbutton 8 is depressed. Unlike the first embodiment, the blocking oscillator oscillates only while the charger switch 21 is turned on to charge the main capacitor 26.

When the charger switch 21 is turned on, a current flows from the battery 20 to the resistors 80a and 80b. The voltage divided by the resistors 80a and 80b is applied to the base of the oscillation transistor 22 as base voltage. Then the oscillation transistor 22 is turned on. The oscillation transistor 22 causes oscillation in accordance with the positive feedback from the oscillation transformer 23, to increase the primary-side current flowing in the primary winding 35 in the direction from the second terminal 23b to the first terminal 23a. Electromotive force of high voltage is generated in the secondary winding 36. As the winding direction of the primary winding 35 is reverse to that according to the former embodiments, the secondary-side current flows in the secondary winding 36 in the direction from the fourth terminal 23d to the fifth terminal 23e.

The secondary-side current flows in the closed circuit constituted by the fifth terminal 23e, the rectifier diode 31, the main capacitor 26, a line to the base of the oscillation transistor 22, a line to the emitter of the oscillation transistor 22, the battery 20, the charger switch 21 and the fourth terminal 23d. As the negative electrode of the main capacitor 26 is grounded via the lines at the base and the emitter of the oscillation transistor 22, the main capacitor 26 is charged in such a positive charging manner that a potential of the positive electrode of the main capacitor 26 is increased with reference to the grounded potential or the potential of the negative electrode of the battery 20.

It is to be noted that a metallic chassis of the camera or a casing of the battery of the lens-fitted photo film unit has the grounded potential when provided with electric circuits. The main capacitor 26 has an outer metallic casing of which a potential is equal to the negative electrode of the main capacitor 26. When the main capacitor 26 is charged in the negative charging manner, the potential of the metallic casing is lowered. An accidental electric shock to a user's hand is likely to occur if the metallic casing of the main capacitor 26 is touched by it at the same time as the camera chassis or the battery casing, or if the metallic casing of the main capacitor 26 is wetted with water at the same time as the latter. However the above-mentioned positive charging manner causes the potential of the positive electrode of the main capacitor 26 to rise over the grounded potential. The metallic casing of the main capacitor 26 is kept to have the grounded potential. This is advantageous in reducing possibility of electric shock to human bodies.

The Zener diode 32 has the cathode connected with the positive electrode of the main capacitor 26, and the anode connected with the base of the stop transistor 33. When the main capacitor 26 is charged to the standard full-charged voltage, the Zener diode 32 causes the Zener current to flow to the base of the stop transistor 33. The stop transistor 33 is an n-p-n transistor.

The primary winding 28a of the trigger transformer 28 has one end grounded via the trigger capacitor 27, and one remaining end grounded via the trigger switch 29. The secondary winding 28b has one end connected with the trigger electrode 25a, and one remaining end connected with one electrode of the flash discharge tube 25. When the trigger switch 29 is turned on, flash light is emitted.

The optical data recorder device 50 and the timer circuit 60 are similar to those according to the embodiment of FIG. 9. The timer capacitor 61 is connected with the negative electrode of the battery 20 via the trigger switch 29 to be charged. The diode 52 is so connected that its cathode is directed to the trigger switch 29. The timer transistor 64 is a p-n-p transistor, and turned on for the time Ta by the charged voltage of the timer capacitor 61.

The switching transistor 51 is an n-p-n transistor controllable by the timer transistor 64 connected on the positive electrode of the battery 20. The switching transistor 51 has the base connected with the collector of the timer transistor 64, and has the emitter which is grounded. The LED 14 and the current limiter resistor 14a are connected in series between the collector of the switching transistor 51 and the first terminal 23a of the primary winding 35. The switching transistor 51 has a state depending only on the timer transistor 64, and is turned on while the timer transistor 64 is turned on.

An oscillation continuing transistor or auxiliary transistor 77 has an emitter and a collector, which are connected with respective terminals of the charger switch 21. The oscillation continuing transistor 77 has operation similar to that of the latch transistor 24. But the oscillation continuing transistor 77 has the base connected with the collector of the switching transistor 51, and is turned on while the switching transistor 51 is turned on or while the timer transistor 64 is turned on. The present construction is different from that of FIG. 3 and the like in that the oscillation continuing transistor 77 is not turned on in response to operation of the oscillation transistor 22.

The operation of this construction is described now. When the trigger switch 29 is turned on upon taking an exposure, the timer circuit 60 is operated irrespective of the state of the charger switch 21. The timer transistor 64 is turned on only during the time Ta. Consequently the switching transistor 51 is turned on. The LED 14 comes to have the state connected between the first terminal 23a and the grounded point. The oscillation continuing transistor 77 is turned on, so that the blocking oscillator operates during the lapse of the time Ta.

Each time that back electromotive force occurs in the oscillation transformer 23, the pulsed voltage generated between the first terminal 23a and the grounded potential causes the LED 14 to emit light repeatedly, to record the PAR indicia 12 to the photo film 9b. When the timer transistor 64 is turned off, the switching transistor 51 and the oscillation continuing transistor 77 are turned off. If the charger switch 21 has been turned off, the oscillation of the blocking oscillator is stopped in response to turning off of the oscillation continuing transistor 77.

In the above embodiments, the light-emitting diode is used for recording the indicia. Moreover other elements, for example an electroluminescence (EL) element may be used for emitting light for the purpose of recording. The electroluminescence is driven to illuminate by alternating current of considerably high voltage. While the timer circuit is turned on, the voltage of the alternating current may be obtained from the secondary winding of the oscillation transformer at a voltage value as required. The obtained voltage may be applied to the electroluminescence to emit light.

In the above embodiments, the timer circuit is operated by turning on the trigger switch. Alternatively the timer circuit may be operated by turning on a mechanical switch or a photoelectric switch having a photo sensor. The above-described use of the trigger switch is preferable, because of the small number of the parts. In addition, the optical data may be photographing data including the date of taking an exposure, the value of the aperture stop, and the shutter speed, instead of the PAR indicia. Of course the optical data recorder device may be incorporated in a camera instead of the lens-fitted photo film unit.

In the above embodiment, the timer circuit 60 includes the timer transistor 64 which is a bipolar junction transistor. Instead of the timer transistor 64, the timer circuit 60 may include any suitable kind of switching element.

In the above embodiment, the timer circuit is constituted by a combination of the transistor and the capacitor. Alternatively a microcomputer may be used as a timer circuit.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical data recorder device for use in a camera or a lens-fitted photo film unit, said camera and said lens-fitted photo film unit respectively including a shutter for providing photo film with an exposure to create a frame, and a flash circuit for emitting flash light to a subject to be photographed, said flash circuit including a blocking oscillator for converting low voltage of a battery into high voltage of an alternate current by oscillation, said optical data recorder device comprising:

a timer circuit for starting in response to actuation of said shutter operation, said timer circuit measuring predetermined time of lapse, and starting said oscillation of said blocking oscillator;

a light-emitting element for illuminating with voltage obtained from said blocking oscillator during said predetermined time measured by said timer circuit, to record data optically in a position on said photo film respectively for said frame a switching element, connected in series with said light-emitting element, turned on during said predetermined time measured by said timer circuit, to drive said light-emitting element;

a rectifier, connected with said blocking oscillator, for rectifying said alternate current of said high voltage;

a main capacitor charged by a current from said rectifier;

a flash discharge tube, connected in parallel with said main capacitor, for instantaneously illuminating with a discharge current of said main capacitor; and a trigger circuit for applying trigger voltage to said flash discharge tube in response to said actuation of said shutter, to start discharging said main capacitor;

wherein said trigger circuit includes a trigger switch, turned on in response to said actuation of said shutter, for generating said trigger voltage, wherein said timer circuit is adapted to be started by turning on of said trigger switch; and wherein said timer circuit includes:

a timer capacitor for starting being charged or discharged in response to turning on of said trigger switch; and a timer transistor, turned on in accordance with voltage across said timer capacitor, wherein said switching element is turned on while said timer transistor is turned on, and said predetermined time is defined while said timer transistor is turned on.

2. An optical data recorder device as defined in claim 1, wherein said timer capacitor is charged in connection with said battery when said trigger switch is turned on, and is discharged when said trigger switch is turned off;

said timer transistor is kept turned on after said timer capacitor starts being discharged and until said voltage across said timer capacitor comes down to predetermined voltage.

3. An optical data recorder device as defined in claim 2, wherein said blocking oscillator includes an oscillation transformer, a oscillation transistor and an externally operable charger switch, and said oscillation transformer includes primary, secondary and tertiary windings;

said primary winding is connected in series with said oscillation transistor and said battery, a base of said oscillation transistor being connected with said secondary and tertiary windings;

said secondary winding is connected with said main capacitor via a diode constituting said rectifier, for inducing said high voltage upon powering said primary winding to charge said main capacitor; and said tertiary winding is connected in series with said battery via said charger switch.

4. An optical data recorder device as defined in claim 3, wherein said switching element is a switching transistor, said switching transistor and said light-emitting element are connected in series with said primary winding, and a base of said switching transistor is connected with said timer transistor, for turning on said switching transistor when said timer transistor is turned on.

5. An optical data recorder device as defined in claim 4, wherein said blocking oscillator includes a latch transistor having an emitter and a collector connected in parallel with said charger switch, and said latch transistor is turned on in a first condition where said charger switch is turned off after being turned on, or said latch transistor is turned on in a second condition where said timer transistor is turned on;

in said first condition, said blocking oscillator continues said oscillation, to charge said main capacitor irrespective of turning off of said charger switch;

in said second condition, said blocking oscillator starts said oscillation, to drive said light-emitting element for said predetermined time, and to charge said main capacitor.

6. An optical data recorder device as defined in claim 5, wherein said flash circuit further comprises a circuit for stopping said oscillation of said oscillation transistor by detecting a fully charged state of said main capacitor.

7. An optical data recorder device as defined in claim 5, wherein a base of said latch transistor is connected with said primary winding and said oscillation transistor via a first resistor, and is also connected with said timer transistor via a second resistor.

8. An optical data recorder device as defined in claim 5, wherein said timer circuit further comprises a first resistor, connected in parallel with said timer capacitor, for discharging said timer capacitor.

9. An optical data recorder device as defined in claim 8, wherein said timer circuit further comprises a second resistor connected in series with said first resistor, wherein a connection point between said first and second resistors is connected with a base of said timer transistor.

10. An optical data recorder device as defined in claim 8, wherein said timer circuit further comprises a second resistor, connected between a base of said timer transistor and a connection point between said first resistor and said timer capacitor, for avoiding a drop in voltage of said battery when said timer transistor is turned on.

11. An optical data recorder device as defined in claim 8, wherein said timer circuit further comprises a diode, connected between said timer capacitor and said trigger switch, for protecting said timer transistor by inhibiting said timer capacitor from being charged in reverse.

12. An optical data recorder device as defined in claim 11, wherein said timer circuit further comprises a second resistor, connected in series with said diode, for reducing a drop in voltage at said diode by reducing a current flowing in said diode.

13. An optical data recorder device as defined in claim 12, wherein said timer circuit further comprises a Zener diode, connected in parallel with said timer capacitor, for determining an upper limit of said voltage across said timer capacitor, to reduce a change in said predetermined time.

14. An optical data recorder device as defined in claim 4, wherein said blocking oscillator includes an auxiliary transistor having an emitter and a collector connected in parallel with said charger switch, a base of said auxiliary transistor is connected with said switching transistor, for turning on said auxiliary transistor when said switching transistor is turned on, wherein said auxiliary transistor is turned on in a condition where said timer transistor is turned on, then said blocking oscillator starts said oscillation, to drive said light-emitting element for said predetermined time, and to charge said main capacitor.

15. An optical data recorder device adapted for use in a photographic device, said photographic device comprising a shutter and a flash circuit, said flash circuit comprising a blocking oscillator adapted for use in converting from a battery voltage to an increased voltage through oscillation, said optical data recorder device comprising:

a light-emitting element connected to a voltage from the blocking oscillator, said light-emitting element being adapted to record data on a photographic film contained within the photographic device; and a timer circuit adapted to control the connection of the light-emitting element to the voltage from the blocking oscillator so that the light-emitting element is powered for a predetermined period of time following a release of the shutter.

16. The optical data recorder device of claim 15, further comprising a switching transistor adapted to control current flow through the light-emitting device, wherein the switching transistor is turned on by the timer circuit.

17. The optical data recorder device of claim 16, wherein the timer circuit comprises:

an RC circuit; and a timer transistor;

wherein the RC circuit is adapted to provide a bias voltage to turn on the timer transistor.

18. The optical data recorder device of claim 17, wherein the RC circuit comprises a timer capacitor;

wherein the timer capacitor is adapted to be charged by the battery following the release of the shutter; and wherein the timer capacitor is adapted to discharge through the RC circuit to bias the timer transistor for the predetermined period of time.

19. The optical data recorder device of claim 18, wherein the RC circuit further comprises two resistors arranged as a voltage divider, a base of the timer transistor being electrically connected to a point between the two resistors.

20. The optical data recorder device of claim 19, wherein values of the two resistors and the timer capacitor provide a discharge rate to provide the predetermined period of time during which the light-emitting element is connected to the voltage from the blocking oscillator.

21. The optical data recorder device of claim 18, wherein the switch transistor is adapted to be turned on by the timer transistor.

* * * * *